US012766476B2

(12) United States Patent
Cassidy et al.

(10) Patent No.: US 12,766,476 B2
(45) Date of Patent: Oct. 20, 2026

(54) SYSTEMS AND METHODS FOR PYROLYSIS REACTIONS

(71) Applicant: Clean Hydrogen Technologies Corp, New York, NY (US)

(72) Inventors: David Cassidy, Sydney (AU); Vivek Nair, West Coast Park (SG); Peter Williams, Belmont, CA (US); Venkateswara Rao Sodisetti, Johannesburg (CA)

(73) Assignee: CLEAN HYDROGEN TECHNOLOGIES CORP, New York, NY (US)

( * ) Notice: Subject to any disclaimer, the term of this patent is extended or adjusted under 35 U.S.C. 154(b) by 147 days.

(21) Appl. No.: 18/790,467

(22) Filed: Jul. 31, 2024

(65) Prior Publication Data

US 2024/0390872 A1 Nov. 28, 2024

Related U.S. Application Data

(62) Division of application No. 18/308,071, filed on Apr. 27, 2023, now Pat. No. 12,076,718.

(Continued)

(51) Int. Cl.
*B01J 6/00* (2006.01)
*B01J 8/18* (2006.01)

(52) U.S. Cl.
CPC ............. *B01J 6/008* (2013.01); *B01J 8/1809* (2013.01); *B01J 8/1872* (2013.01); *B01J 2208/00433* (2013.01); *B01J 2208/00654* (2013.01)

(58) Field of Classification Search
CPC ... B01J 6/008; B01J 8/1872; B01J 8/44; B01J 8/005; B01J 8/1809; B01J 2208/00433; B01J 2208/025
See application file for complete search history.

(56) References Cited

U.S. PATENT DOCUMENTS

| | | | |
|---|---|---|---|
| 3,948,645 | A | 4/1976 | Elvander et al. |
| 2009/0169465 | A1 | 7/2009 | Jang et al. |

FOREIGN PATENT DOCUMENTS

| | | | | |
|---|---|---|---|---|
| CN | 102443419 B | 7/2014 | | |
| CN | 114394588 A | 4/2022 | | |
| WO | WO-2021195566 A1 * | 9/2021 | ............... | C01B 3/28 |

OTHER PUBLICATIONS

International Search Report and Written Opinion issued Sep. 6, 2023 in corresponding PCT Application No. PCT/US2023/066301.

(Continued)

*Primary Examiner* — Lessanework Seifu

(74) *Attorney, Agent, or Firm* — Venable LLP; Ryan T. Ward

(57) ABSTRACT

Systems and methods for pyrolysis using an induction source of energy. A system can include: a reaction chamber, the reaction chamber having a cylindrical shape, the reaction chamber containing a catalyst; a fluidization plate connected to a first end of the reaction chamber; a gas input receiver connected to the fluidization plate; and a mechanism connected to a second end of the reaction chamber, wherein, during operation of the system: hydrocarbon gas is received at the gas input receiver, the input gas is forced through the fluidization plate; the fluidized gas mixes with the catalyst, resulting in at least one catalyzed molecule; the at least one catalyzed molecule undergo pyrolysis, resulting in at least two cracked elements; and the at least two cracked elements are removed from the system via the at least one output mechanism.

6 Claims, 12 Drawing Sheets

Related U.S. Application Data

(60) Provisional application No. 63/379,021, filed on Oct. 11, 2022, provisional application No. 63/365,716, filed on Jun. 2, 2022, provisional application No. 63/365,053, filed on May 20, 2022.

(56) References Cited

OTHER PUBLICATIONS

Non-Final Rejection issued Feb. 5, 2024 in corresponding U.S. Appl. No. 18/30,8071.

* cited by examiner

SYSTEMS AND METHODS FOR PYROLYSIS REACTIONS

PRIORITY

The present application claims priority to U.S. Provisional Application No. 63/365,053, filed May 20, 2022; U.S. Provisional Application No. 63/365,716, filed on Jun. 2, 2022; U.S. Provisional Application No. 63/379,021, filed on Oct. 11, 2022; and U.S. Non-Provisional application Ser. No. 18/308,071, filed on Apr. 27, 2023, the contents of each of which are incorporated herein in their entirety.

BACKGROUND

1. Technical Field

The present disclosure relates to pyrolysis, and more specifically to cracking molecules using an induction source of energy.

2. Introduction

Induction heating is a fast and efficient contactless method for heating conductive materials such as metals, metallic and electromagnetic elements semiconductors, and other electromagnetic elements by applying a fluctuating magnetic field.

SUMMARY

Additional features and advantages of the disclosure will be set forth in the description that follows, and in part will be understood from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Disclosed are systems, methods, and non-transitory computer-readable storage media which provide a technical solution to the technical problem described. A method for performing the concepts disclosed herein can include: receiving gas at a gas input receiver, resulting in input gas; forcing the input gas from the gas input receiver through a fluidization plate and into a reaction chamber, the reaction chamber encircled by an inductive coil, the fluidization plate located between the gas input receiver and the reaction chamber, resulting in fluidized gas in the reaction chamber; mixing the fluidized gas with a catalyst stored in the reaction chamber, resulting in at least one catalyzed molecule; generating, via the inductive coil, an electromagnetic field within the reaction chamber, the electromagnetic field causing pyrolysis of the at least one catalyzed molecule in reaction chamber, resulting in at least two cracked elements, at least one of the two cracked elements being a bespoke form of carbon; and removing the at least two cracked elements from the reaction chamber via at least one output mechanism.

A system configured to perform the concepts disclosed herein can include: a reaction chamber, the reaction chamber having a cylindrical shape, the reaction chamber containing a catalyst; a fluidization plate having two sides, a first side of the fluidization plate being tangibly connected to a first end of the reaction chamber; a gas input receiver tangibly connected to a second side of the fluidization plate; at least one output mechanism tangibly connected to a second end of the reaction chamber; and an inductive coil encircling the reaction chamber, wherein during the operation of the system the inductive coil creates an electromagnetic field, wherein, during operation of the system: hydrocarbon gas is received at the gas input receiver, resulting in input gas; the input gas is forced through the fluidization plate, resulting in fluidized gas in the reaction chamber; the fluidized gas mixes with the catalyst, resulting in at least one catalyzed molecule; the at least one catalyzed molecule undergo pyrolysis, resulting in at least two cracked elements; and the at least two cracked elements are removed from the system via the at least one output mechanism, at least one of the two cracked elements being a bespoke form of carbon in a solid form.

A system configured to perform the concepts disclosed herein can include: a fluidized bed reactor, where cracking of an inert gas occurs within the fluidized bed reactor using a combination of an electromagnetic field and a catalyst with electro-magnetic properties, resulting in at least one of a targeted carbon black and a carbon nano-object.

A system configured to perform the concepts disclosed herein can include: a reaction chamber, where cracking of an inert gas occurs within the reaction chamber using a combination of an electromagnetic field and a catalyst with electro-magnetic properties, resulting in at least one of a targeted carbon black and a carbon nano-object.

DETAILED DESCRIPTION

Figure 1:
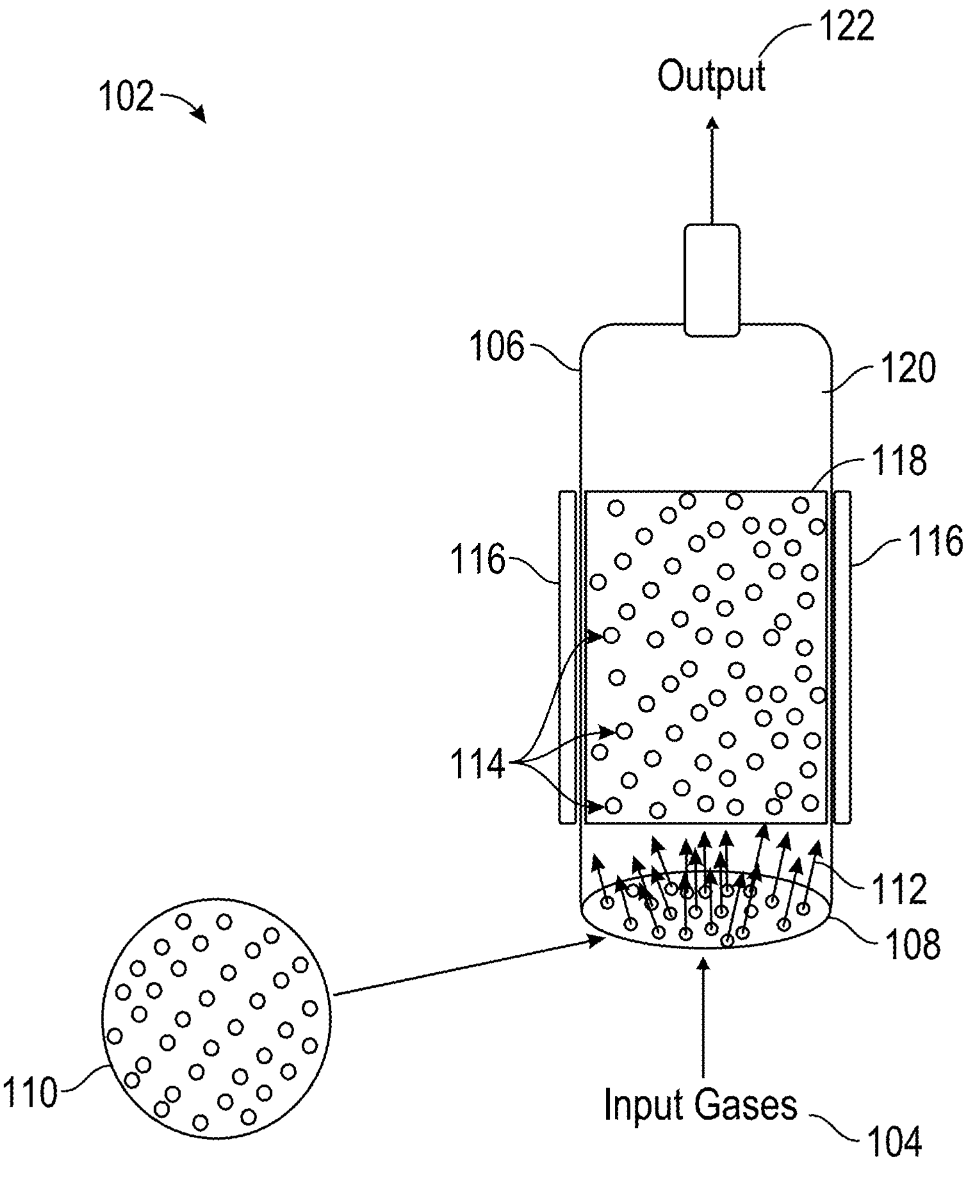
FIG. 1 illustrates an example of a fluidized bed reactor with an electric heating coil and catalyst.

Various embodiments of the disclosure are described in detail below. While specific implementations are described, this is done for illustration purposes only. Other components and configurations may be used without parting from the spirit and scope of the disclosure.

pyrolysis systems use energy in an endothermic reaction to split (also referred to as “cracking”) molecules, such as hydrocarbons (such as, but not limited to: acetylene, methane, propane, and butane), into their component elements carbon and hydrogen where the Carbon is in a solid form and Hydrogen in a gaseous form. The pyrolysis process has no oxygen present and as such it is considered an inert process, and because the carbon has no oxygen to join hence there are no $CO_2$ emissions.

However, creating the heat necessary for an effective pyrolysis can be inefficient. For example, in systems which rely upon an electrical heater, heat is applied to the container containing the hydrocarbons directly. The amount of energy required depends, on what components and capabilities that make up the system to achieve the cracking and therefore such method is energy inefficient.

Heat on its own delivers limited efficiency in cracking molecules, where efficiency is considered to be the total amount of molecules split or cracked into their component elements per hour, referred to as the “cracking efficiency.” The most common source of heat is electrical heaters. Heat is an energy entropy of a material that can be increased or decreased by changing the surrounding environment. Electric heating involves passing current through a resistive material and the materials ability to resist the electrical conduction will generate heat. Where such heat is transferred to a secondary object through conduction, convection, and radiation. The method of transferring heat through electric heating involves energy losses, and is therefore less energy efficient when compared to induction. Induction heating for pyrolysis is more energy efficient in transferring the heat than electric heating, as the induction heating directly causes magnetic agitation of the object itself.

Another use of heat is to change the internal structure of specific materials (such as catalytic materials made of metals), thereby changing the effective binding/bonding energy of the respective element, which can influence/encourage a greater cracking efficiency of hydrocarbons undergoing pyrolysis.

In some direct heat embodiments, the molecules to be cracked are passed over or through an area of a device where a constant heat at an appropriate temperature is applied. If no catalyst is provided (such that pyrolysis requires heat alone for the reaction) this typically requires temperatures above 1,100° C., where the majority of the molecules are still not cracked, often having a cracking efficiency less than 40%. As such heat alone is not an efficient enabler of cracking.

Use of a catalyst and heat, where the catalyst has active elements and molecules that assist in cracking has been proven to improve overall cracking efficiency. For example, such systems can decrease the total amount of heat required for the cracking, typically less than 900° C. However, there are a number of systemic considerations involved in the development of effective catalysts, including the materials used and process to create the catalyst, use of a carrier beads which can be coated with a catalyst, the catalyst's composition, size, volume, distribution, coatings, and other physical and chemical attributes.

In some situations, where the catalyst increases cracking efficiency, it can also bring about other efficiencies, such as less time for the reaction and less temperature or energy required for the splitting of the molecule. A challenge in the use of catalyst is their effective distribution in the system where the reaction for splitting molecules happens. Typically, fluidized bed processes (e.g., fluidized bed reactors) are considered the best for distributing the catalyst effectively thus maximizing the catalyst surface area to contribute to more effective cracking efficiency.

Fluidization of solid particles such as a catalyst encourages the solid particles to behave like a fluid under the action of a gas (or gases) flow, speeds, dispersion typically where the gas or gases are passed through fluidization plates which are plates with predefine hole sizes, number of holes and positions on the plate. Fluidization technology allows solid particles to become quasi fluids under the action of airflow and have the properties of a fluid. Typically, a bed of particles of certain density and sizes are fluidized by passing gases through them. When the force, coming from the flow of gas, acting on the bed particles is equal & opposite to the weight/gravity of the particles, it is said to be in a fluidized state. The minimum velocity of the gas that makes the bed fluidized is called the minimum fluidization velocity. In the fluidized state, the particles of the bed exchange heat more efficiently, and expose more surface for reaction with the reactant component of the gas or fluid. Fluidization of particles depends, at least in part, on the pressure variation, for example the drop of the bed, and the minimum fluidization gas velocity which is inherent to the nature of the particles in the bed.

Typically, a bed of particles (for example the catalyst), which is of certain density and size, weight, and volume, is fluidized by passing gases through the fluidization plate at a speed where the catalyst suspends above the plate and behaves like a fluid. When the force, coming from the flow of gas, acting on the particles is equal and opposite to the weight/gravity of the particles, the bed of particles is said to be in a fluidized state. The minimum velocity of the gas that makes the particles fluidized is called the minimum fluidization velocity. In the fluidized state, the particles of exchange (i.e., the catalyst and the input gas) heat efficiently, thus contributing to the consistent and normalized temperature of a specific area in the device. This area is sometimes referred to as the hot zone. The effective distribution of the particles of exchange also exposes more particle surface area for reactions to occur between the catalyst (which stays in the device) and the molecules of gases passing through the hot zone at high speed.

Once the molecule cracks (in the case of hydrocarbon input gases this results in gaseous hydrogen and solid carbon nanomaterials), a resulting challenge can be realized where the carbon produced by the pyrolysis contributes to clogging in the system, thus limiting the continuous operational capabilities of the system. This can result in batch-like processing, where the carbon build-up requires periodic shutdown and cleanout of the system.

Controls often used to produce a desired type of carbon nanomaterials include controlling the temperature, pressure, residence time, and gas composition of the inputs, as well as catalyst control (i.e., modifying the morphology, composition, dopants, and/or size of the catalyst). Even though both these controls have provided various options to produce specifications of carbon black, they present inherent limitations. Specifically, such controls can fail to generate a uniform output quality, and therefore require additional processing of the outputs before they are in condition for further use.

When used herein, the term “carbon nanomaterial” may refer to any suitable material that has suitable size range. For example, in certain configurations, the carbon nanomaterial may have an average hydrodynamic diameter range. Non-limiting examples of that average hydrodynamic diameter range can be from 1 to 1,000 nm, from 100 to 400 nm, from 1 to 100 nm, or any other range as required. In some configurations, the term "carbon nanomaterial" may refer to a "carbon nano-object" as defined under the standard "ISO/TS 80004-3:2020(en) Nanotechnologies—Vocabulary—Part 3: Carbon nano-objects", which is hereby incorporated herein by reference in its entirety.

Examples of suitable carbon nanomaterials include, but are not limited to: carbon nanotubes, carbon nanofibers, fullerenes, graphenes, graphene oxides, nanographites, carbon blacks, acetylene blacks, thermal blacks, mesoporous carbons, carbon quantum dots, graphene quantum dots, and/or combinations thereof. In some configurations, the carbon nanomaterial may be a graphene and/or a carbon black. These materials may be as defined in the standard "ISO/TS 80004-3:2020(en) Nanotechnologies—Vocabulary—Part 3: Carbon nano-objects". In some configurations, the graphene may be in the form of graphene nanoplatelets and the carbon black may be in the form of Ketjen black. Graphene nanoplatelets as used herein may take the definition of the standard: ISO/TS 80004-13:2017, which is hereby incorporated herein by reference in its entirety. Suitable graphene nanoplatelets may be commercially available.

Instead of using an electric or any other non-inductive heater, systems configured as described herein can use an inductive heater in combination with catalyst to enable more effective cracking, targeted carbon nano object specifications, and more continuous cracking. The system can include one or more reaction chambers within a work-piece, where input gasses are pushed into the reaction chambers, which comes in contact with a catalyst, and are cracked via pyrolysis. The pyrolysis is driven by the inductive heater creating an electromagnetic field. The results of the cracking (generally a gas) can then be removed from the system.

An inductive heater provides several benefits in comparison to non-inductive heaters. For example, an inductive heater need not be in physical contact to transfer heat, and can instead heat the target directly-such as the catalyst particles. In addition, an inductive heater can produce an electro-magnetic field which contributes to the effectiveness of the cracking and the quality and type of the carbon nano-objects. An inductive heater can also reduce and/or minimize carbon clogging to a level where the system can operate continuously.

Moreover, induction heating is a fast and efficient contactless method for heating conductive materials such as metals and semiconductors by applying a fluctuating magnetic field. Induction heating is particularly useful for performing highly precise or repetitive operations. In induction heating, an alternating current (AC) source is used to supply current to an induction heating coil. As a result, the coil generates an alternating magnetic field. When an object is placed in this alternating magnetic field, two heating effects occur:

- Hysteresis losses—Due to the continuous process of magnetization and demagnetization within the material inserted into the alternating magnetic field, energy is continuously lost in the form of heat. This energy loss is hysteresis. Hysteresis is an effect caused when magnetic particles are forced to align in an opposite direction against their ease of magnetization by applying an external magnetic field. Hysteresis is a result of remnant magnetization of individual particles, where when the individuals are forced to align in the opposite direction those individual particles resist the applied external magnetic field resulting in generation of heat from friction between the molecules. Hysteresis can occur in magnetic materials such as iron, nickel, cobalt, etc. A higher magnetic field oscillation frequency, which results in faster particle movement, can cause more friction and thus more heat.
- Eddy current losses—When magnetic material comes under a magnetic field generated by alternating current, an Electro Magnetic Field (EMF) is induced. The magnetic material has an electrical conducting property, and the induced EMF in the material causes current to flow within the magnetic material. That current circulates within the material and is called an eddy current. The heat loss caused by eddy currents in the magnetic material is called an eddy current loss. This loss occurs in any conductive material induced by the fluctuating magnetic field because of the resulting electric currents (i.e., the eddy currents). For example, when a conductive object is placed in an alternating current (AC), the EMF produced by AC in the primary coil will induce an electrical conduction in the conductive object, however this conduction is poor and often generates heat (i.e., the eddy currents).

Both effects result in heating of an object inserted into the alternating field, but eddy current loss is often the main heat source in inductive heating processes. Hysteresis requires the use of magnetic materials, and magnetic materials lose their magnetic specificities if heated above a specific temperature (the so-called "Curie point"), such that the temperatures of inductive-heated materials need to be monitored to ensure the materials to not exceed the Curie point. Eddy currents also depend on the magnetic field frequency due to the "skin effect" (where, at high frequencies, the eddy currents flow close to the conductive material surface). The skin effect can be used to control the penetration depth of the induction heating process. As a result, the whole object, or only a specific part of the object (for example, only the surface), can be heated by adjusting the strength/size of the induced magnetic field.

Because inductive heating does not require direct or indirect contact for its targeted heating, the width of the reactor system can be much larger than those which rely upon direct heating, resulting in greater volumes of hydrogen and carbon black production, while also resulting in greater cracking efficiency. Moreover, because induction heating can generate uniform heat inside the heated object itself, induction heating is more efficient compared to heating by conduction, convection, and radiation. For example, the rate of heating (also known as the "ramping time") can be faster with induction heating compared to other forms of heating. In addition, as induction heating is a contactless heating, there is also reduced contamination and reduced mechanical abrasion resulting from movement of heating elements' contact points compared to other forms of heating.

A work-piece as described herein can be cylinder (or other voluminous shape) containing one or more reaction chambers in which catalyst and gasses can mix and undergo pyrolysis. For example, the work-piece may be a drum or cylinder with an induction heating coil wrapped around it, into which smaller cylinders (e.g., reaction chambers containing catalyst) can be inserted, removed, and/or operated. In other configurations, the work-piece may contain multiple coils/solenoids into which the smaller cylinders can be placed, such that the inductive field for each reaction chamber can be monitored and individualized. The principles of both configurations are discussed herein are interoperable, such that discussion regarding a singular work-piece applies to both configurations with a single reaction chamber and configurations with multiple reaction chambers contained therein and vice versa (unless expressly indicated). The material for the reaction chamber can be an insulator material, where the reaction chamber holds/contains an electrically conductive (and preferably magnetic) catalyst that can be heated by electromagnetic induction. For example, the material of the reactor chamber can be quartz, alumina, etc.

An induction heater as described herein can include a coil (which becomes a solenoid when current is applied to it), made from a compound capable of carrying current. Non-limiting examples of electrically conductive materials can include metals and/or carbon materials (CNTs (Carbon NanoTubes), CNFs (Carbon NanoFibers), etc.) shaped into forms such as (but not limited to) solid wire, wound tube, concentric fibers, hollow pipe, helical coil, and the like. In many embodiments, the aspect ratio is very high i.e., length is much greater than the diameter. The coil can exist in any plurality of shapes and geometry as long as it is able to pass current of at least one frequency and generate a stable and alternating magnetic field in a volume of space.

The inductive efficiency and the field pattern generated by the coil is determined, at least in part, by its diameter, shape, construction (including materials used and/or coil characteristics, such as hollow, wall thickness, and cooling systems), and the number of turns. In some configurations an induction coil can be constructed of copper tubing with fluid coolant running through them, such that the temperature of the coil may be controlled in support of optimizing system performance characteristics.

Preferably, the work-piece an electrically conductive material (with or without magnetic properties). An alternating current (AC) at a selected frequency is passed through the coil or solenoid using an electronic oscillator. This generates an oscillating magnetic field which penetrates the work-piece container containing any catalyst and the input/output gases, generating eddy currents within the work-piece. The depth up to which the eddy current penetrates the catalyst/gas mixture depends on the selected frequency of the AC, and follows an inverse (or an inverse square) law—i.e., the higher the frequency, the lower the depth of penetration, and vice versa. The eddy currents generated within the work-piece encounter resistance within the bulk of the catalyst/gas mixture material, causing the material to heat. Additionally, if the work-piece container has magnetic properties (i.e., the container is ferromagnetic), heat can also be generated by magnetic hysteresis loses. Please note that primary coil and/or the object being affected by the oscillating magnetic field need not be made of a magnetic material. For example, the coil can be a superconducting material, and the object can be of a resistive material.

Preferably, systems configured as disclosed herein include several sensors which communicate with a control system (e.g., a computer system, such as a server, desktop computer, etc.) using, for example, Peripheral Component Interconnect (PCI) controllers for attaching peripheral devices to a computer. The sensors can communicate back to the control system, allowing the system to vary inductive heating to maximize cracking efficiency with minimal use of energy, thereby producing little or no carbon clogging and thus allowing the system to operate continuously.

The inductive efficiency and the field pattern generated by the coil is determined, at least in part, by its diameter, shape, construction (including materials used and/or their coil characteristics, such as hollow, wall thickness, cooling systems and the like) and the number of turns. Systems configured as disclosed herein can use that information, coupled with any sensor data, to determine the optimal electromagnetic field strength for a given work-piece and/or reaction chamber. For example, the system can include a computer or other control system in communication with the work-piece and sensors contained within the work-piece, allowing the system to modify the electromagnetic field during operations.

To create an appropriate AC waveform to induce the desired electromagnetic field an electronic oscillator can be employed, preferably an oscillator which can generate AC at a range of frequencies. Systems configured as disclosed herein may employ oscillators that can produce multiple waveforms, such as sine, square, triangle and other specialized waveforms that can modify the operations of the coil and the subsequent generation of the magnetic field. Operating frequencies can vary depending on the material being heated, the capacity (volume) of the reaction chamber, and the speed of heating required. The oscillator(s) controlling the frequency generation may be configured to vary the frequency, thereby facilitating variation in the resulting magnetic field and the operation of that magnetic field on the work-piece. For example, frequencies may be varied to achieve different magnetic effects on the work-piece and/or vary the operating parameters of the coil. The oscillator(s) can be in communication with the computer or control system to determine what frequency output to provide.

The frequency to be selected for the alternating current depends, at least in part, on the capacity (size, volume) of the encompassed space, selected and/or configured heating speed of the process, and/or material type of the work-piece. To achieve the desired penetration depth for heating by eddy currents, the system can use modify several variables, including (but not limited to), temperature of the work-piece changes in work-piece conductivity, and/or changes in work-piece permeability. The precision control of the frequency of the AC, which in turn generates the magnetic field, provides the capability to optimize characteristics of the work-piece, such that specific aspects or portions of that work-piece (such as reactions occurring within the work-piece) can be optimized. Additionally, lower frequencies can generate turbulence in the work-piece, which can be used for heat distribution within the reaction environment as well as increasing the kinetics of the catalyst/gas mixture (e.g., causing a stirring or turbulent motion), thereby exposing the reactants to more active surface area of the catalyst molecules than when those lower frequencies are not deployed.

For an effective use of an inductive process, a work-piece and/or any smaller units (i.e., smaller reaction chambers) stored within the work-piece is preferably electrically conductive and can optionally be magnetic in nature. Magnetic materials are those who have a net magnetic moment even in the absence of a magnetic field. Ferromagnets and ferrimagnets are examples of the class of magnetic materials. Non-limiting examples of ferromagnets can include Fe, Co, Steel, carbon steel, silicon steel, etc. Non-limiting examples of ferrimagnets can include magnetite with its tetrahedral and octahedral sites within its crystal structure exhibiting opposite spins; yttrium iron garnet (YIG); cubic ferrites composed of iron oxides with other elements such as aluminum, cobalt, nickel, manganese, and zinc; and hexagonal or spinel type ferrites, including Rhenium Ferrite, $ReFe_2O_4$, $PbFe_{12}O_{19}$ and $BaFe_{12}O_{19}$ and pyrrhotite, $Fe_{1-x}S$. Other factors that affect the heating of the work-piece are its mass, magnetic permeability, and specific heat of the material.

Knowing the desired temperature of the pyrolysis reaction, properties of the catalyst, reaction conditions, and desired product outcome, the system can identify a preferred catalyst material. Non-limiting examples of catalysts can include: a catalyst material with electrically and magnetically conductive property in the size range of micron to sub-millimeter with a higher Curie point of temperature; in an oxidizing environment, the catalyst can be chosen from the set of ferrimagnetic material inert to oxidation at high temperatures. In some configurations the catalyst can be electrically or magnetically insulative, such that host beads or fillers with electrical and magnetic property can be used for heating purposes. If the catalyst is electrically conductive, the catalyst will be heated by eddy currents. If the catalyst is magnetic, the catalyst will be heated by the hysteresis effect. The heat generated through eddy current loss depends on the size and shape/geometry of the material being subjected to the EMF, and on the shape of the work-piece. If the catalyst is both electrically conductive and magnetic, the catalyst will be heated by both eddy currents and the hysteresis effect. An electrically conductive non-magnetic material, for example copper, will get heated mainly due to eddy currents generated by electromagnetic induction, while an electrically conductive and magnetic material, such as iron, will get heated by both eddy current and hysteresis effects.

If the catalyst is neither electrically conductive nor is magnetic then fillers can also be mixed in with the catalyst to heat the catalyst during the inductive heating. Fillers can be electrically conductive and are preferably magnetic materials with high thermal coefficients which can be mixed with the catalyst in a fluidized or fixed bed reactor that can be used for heating any electrically insulative, or low Curie temperature, catalyst. In such configurations, the heat produced in the fillers or host beads can then be transferred to the catalyst by conduction, convection, and/or radiation. This heating of the catalyst from the fillers can occur mainly via conduction (i.e., the heated/magnetic fillers interacting with the catalyst), but also by convention and radiation. Fillers are mostly in physical contact with the catalyst at the particle level and can thereby enable the effective transfer of thermal energy. Beyond the Curie temperature, certain magnetic and electrically conductive catalysts become paramagnetic, where the magnetic hysteresis supported induction heating ceases. In such cases fillers can also be used for heating where required. Fillers can have catalyst-supporting roles or be catalytically non-active. In a catalyst supporting role, fillers can function like a dopant enhancing the efficiency or active-life of the catalyst. As a non-active catalyst, fillers can function as only a point source of heat for the reaction to happen. Fillers can act as the host for catalyst in the form of beads used for fluidization. Fillers can exist in various shapes, geometry, morphology, porosity, density, and types.

Electromagnetic elements include, but are not limited to, transition metals or combinations of transition metals, lanthanide elements, and/or rare earth elements. When the catalyst is made up of electromagnetic elements loaded over and/or embedded into ceramic (or other materials) beads, the ceramic beads will also be heated by inductive heating. In such cases the reaction chamber and the metallic catalyst particle can transfer the heat to the ceramics by conduction, convection, and radiation. When a reactant gas is passed through such a tube along with inert gas and catalyst vapors, the reactant gas is cracked, producing the desired material (e.g., carbon in case of methane pyrolysis). If the product generated is electrically conductive and/or magnetically conductive, the resulting product can be magnetically induced to generate heat within the system. This improves the rate at which heat is generated, as well as thermal distribution and efficiency of the reaction.

Systems configured as disclosed herein do not require gravity for fluidization, and can operate horizontally, vertically, or at any angle. Since the current alternates to induce the electromagnetic field, this establishes polar affects common to all elements that are prone to magnetic affects, where behavior of the effected elements in the catalyst causes the magnetically effected particulates to move away from one another. Because the particles move away from one another, the catalyst disperses more evenly than non-induction heating systems, resulting in maximum surface area of the catalyst and better cracking efficiency.

Control of the system elements can be done using a central control system, such as a computer. For example, the system can control the flow of gasses into reaction chambers, the size/strength of the electromagnetic field generated from induction heating, and/or the extraction of products. Sensors embedded throughout the system can provide information to the central control system, which can in turn update or modify the instructions being provided to one or more elements of the system. The sensors can also relay information regarding the amount of catalyst remaining in a reaction chamber, the efficiency of reactions, the flow of input gasses into the reaction chamber(s), the rate of product extraction, temperature, pressure, flow rates of gases, magnetic flux, electrical field intensity, etc. The control system may include a dashboard providing representations of this data for operators of these systems. This data may be stored in at least on repository for use by machine learning and other AI techniques The control system may generate predicted values regarding the process (e.g., if "A" amount of catalyst is present in a reaction chamber with an electromagnetic field of strength "B" and "C" amount of input gasses, the predicted efficiency is "X"). When an actual efficiency of the reaction process under those conditions is received, the system can update the prediction process such that future predictions have increased accuracy, and such that the system can induce the various components to produce the results desired.

The control of the AC frequency (via the control system communicating with an oscillator) input into the coil generates the magnetic field and provides the capability to modify one or more characteristics of the products, such that specific types of resulting elements can be produced and controlled. For example, in the separation of $CH_4$ into carbon and hydrogen, the selected frequency range can impact the type of carbon produced. Additionally, if a specific type of carbon is desired, for example graphite or carbon nanotubes, the control system may configure the system to produce this type of carbon, while ensuring the separated hydrogen is as pure as possible.

The control systems can be configured to optimize one or more metrics representing the characteristics of the reaction process. This may include, for example the quantity of catalyst, time of the reaction, type, quantity, and quality of carbon to be produced, temperature of the reaction chamber (and/or the methane and/or catalyst), energy applied, strength of the magnetic field, frequency and waveform of the energy applied, direction and/or shape of the magnetic field, etc.

Reaction chambers as discussed herein (also known as "reactors") can be used for chemical reactions between any phases of matter (solids, liquids, gases, plasma) and their combinations. Reactions can be carried in the presence of an inert gas and/or air as per the reaction requirements. The reactor can be fluidized by gases, vapors, and/or liquids, or kept under only inductive stirring while the reaction happens. An exemplary gas input put into the reaction chamber can be methane, $CH_4$, and exemplary outputs taken from the reaction chamber can include hydrogen gas, e.g., $H_2$, and a solid carbon such as, for example, carbon nanotubes, and/or other solid carbon. The system can also be configured to enable the production of, for example, silicon carbide anode, carbon wrapped silicon nanomaterials, phosphorous 2D material covered by graphene layers and the like. Such materials can be used in many products, such as batteries, and using the control system can be configured to produce specific outcomes to meet the specifications for these product types.

As discussed, the magnetic field can be generated by an AC power supply applied to a coil using an appropriate oscillator, managed by precision control systems. Additional magnets which can also be controlled by the precision control systems, where the additional magnets can modify the electromagnetic field in a desired manner. For example, it may be desirable to have specific portions of the reaction chamber associated with gas ingest control, catalyst control, solid separation control, and gas egress control. The system can, if needed, control additional magnets to influence the electromagnetic field to enable those controls to operate in a desired manner.

The electric and magnetic fields can be applied at various stages of the output (e.g., carbon and gas) formation process, including: (i) prior to synthesis of the output products: which could influence the catalyst particles to be deposited according to the electric field strength and/or magnetic field strength; (ii) during synthesis: which can influence both the catalyst and the formation of carbon that is being formed/gathered on the surface of catalyst; (iii) during the growth of carbon nano-objects: which can further influence both the growth of carbon and the transport of catalyst within reaction chamber; and (iv) post-synthesis: which can allow separation of the carbon from the catalyst, and can further influence transformation of carbon output into nano-objects, such as (but not limited to) carbon nanotubes and fibers.

Carbon nano object (CNT) material is diamagnetic in nature, with different electrical properties. This is evident through the different helicity nature of CNT, namely zig-zag, arm chair, and chiral. The design of the target carbon nano-object specification through induction heating and a control on the catalyst surface activeness results in the formation of the above mentioned variety of CNTs with anisotropic electrical properties. The same idea can be extended not only to the varieties of CNTs, but to variety of carbon nano objects including CNFs, graphene, catalyst filled CNTs, etc.

CNTs exhibit radial and transverse magnetic anisotropy, such that carbon materials within CNTs can contain trace amounts of catalyst within them which can have both magnetic and electrical properties. Diameter uniformity of CNTs and crystallinity of the graphite sheets present within CNTs can be improved by applying an electric field, that aligns the growth of CNTs along the electrostatic force. Electric or magnetic field applied in the post-synthesis phase, allowing generation of CNTs with designed characteristics, where the purity of the CNTs and the desired characteristics can be selected based on the strength, kind, and nature of the field.

A real-time Raman spectroscopy can be used to analyze the type of material produced, and this analysis of the output material can be communicated to the control system. For example, in the case of carbon, the produced carbon can exist as a mixture of CNTs, graphene, carbon black. The control system can receive the spectroscopy analysis and, based on the intensity and D and G peaks, modify control systems to affect how the carbon is being produced.

Exemplary Applications of Applying Electric and Magnetic Fields

The following examples of applying electric and magnetic fields are non-limiting, and can be used individually or combined in any manner required, according to one of ordinary skill in the art. The field strengths, frequencies, gradients, molecular combinations, and other aspects of the examples can vary in practice as required for a specific use case.

Example 1: Targeted Outcomes—to Produce Curled Graphene Nanotubes with 1-3 Layers of Graphene Input Energy: Magnetic field
Field strength: 0.8 mT
Field type: Transverse waves
Frequency of the field: 5 Hz
Material output: Graphene nanotubes
Material purity >99.9%
Number of layers: 1 to 3 layers
Material morphology: curled graphene tubes

Example 2: To Produce Branched Carbon Nanotubes (CNTs)

Input Energy: Magnetic field
Magnetic field strength: 0.2 T
Magnetic field gradient: 50 mT/cm
Magnet used: $Sm_2Co_{17}$ magnet
Catalyst used: Iron nanoparticles
Direction of magnetic field: vertical and parallel to the growth of CNTs
Output: Branched multi-walled carbon nanotubes with 10-20 nm diameter

Example 3: To Produce Curved Carbon Nanotubes (CNTs)

Input energy: Magnetic field
Magnetic field strength: 0.01 T
Magnetic field gradient: 20 mT/cm
Magnet used: NdFeB
Catalyst used: iron nanoparticles
Direction of magnetic field: longitudinal to the growth direction
Output: Curved multi-walled carbon nanotubes with 20-40 nm diameter

Example 4: To Produce Well-Aligned, Crystalline Carbon Nanotubes

Input energy: Magnetic field
Magnetic field strength: 0.38 T
Magnetic field gradient: 65 mT/cm
Magnet used: NdFeB
Catalyst used: Fe—Ni nanoparticles
Direction of magnetic field: parallel to the growth direction of CNTs
Output: Crystalline, aligned multi-walled carbon nanotubes with a diameter of 12-18 nm

Example 5: To Produce Aligned Hollow Core Carbon Fibers (CNFs) with Diameter of 5 to 8 nm Input energy: Electric and magnetic field
Magnetic field strength: 0.5 T
Electric field gradient: 0-50 V/mm Catalyst used: Nickel nanoparticles Direction of electric field: parallel to the growth of CNFs Direction of magnetic field: center to the growth of CNTs Output: Bamboo type aligned hollow core carbon nanofibers with diameter of 5 to 8 nm.

A strong magnetic field can be used to gain increased control and achieve repeatability while producing aligned carbon nanotubes. The influence of a strong magnetic field on the catalyst becomes predominant when the catalyst particles have magnetic properties. The degree of order and arrangement of graphitic layers are influenced by the surface properties of the catalyst, while the carbon diffusion in the catalyst particles depends upon the stress and deformation state of the catalyst. The diamagnetic property of carbon atoms will cause the magnetic torque of the carbon atoms to act in the opposite direction of the magnetic field line, which creates a repulsive force on the atoms, such that the carbon atoms will precipitate along the opposite direction of the strong magnetic field line. This causes carbon atoms to precipitate at the interface of the catalyst particle and the nanotube, creating a compressive force that causes the molten catalyst particle to become like an inverted cone. Therefore, preferential precipitation of carbon induces deformation for the particle, causing nucleated graphite layers to form parallel to the surface lattice of the catalyst particles. Such an arrangement produces CNTs with less vacancy and defects. Higher strength of the energy field (e.g., magnetic, electrical, or electromagnetic) can also reduce the diameter of the catalyst particles and increase uniform size distribution among the catalyst particles, which in turn results in the production of aligned carbon nanotubes with small diameter and uniform size distribution.

Catalytic Decomposition of Methane

The catalytic decomposition of methane follows the reactions at the angstrom level described below in Equations (1)-(5), where there is methane ($CH_4$) chemisorption on the catalyst surface. In the equations 1-5, the * indicates a radical with one electron.

Dissociation of chemisorbed $CH_4$ into a methyl radical and a hydrogen atom:

$$CH_4^* \rightarrow CH_3^* + H^* \qquad \text{Equation (1)}$$

Stepwise dissociation reactions resulting in elemental carbon and hydrogen:

$$CH_3^* \rightarrow CH_2^* + H^* \qquad \text{Equation (2)}$$

$$CH_2^* \rightarrow CH^* + H^* \qquad \text{Equation (3)}$$

$$CH^* \rightarrow C^* + H^* \qquad \text{Equation (4)}$$

Aggregation of atomic hydrogen into molecules:

$$2H^* \rightarrow H_2 \qquad \text{Equation (5)}$$

Carbon nucleation is then followed by the formation and growth of carbon deposits. At the angstrom level, the reaction mechanism involves a free-radical scheme with the initiation and rate-limiting step corresponding to Eq. (1). In addition, at the angstrom level, the carbon formed per Eq. 4 further undergoes surface transport and/or diffusion through the catalyst bulk.

In many situations the catalyst for this type of reaction can be based on a metal or non-metal or oxides/nitrides/sulfides/halogenated forms of metal. The use of metal or electromagnetic elements in the catalysts supports the dissociation of the chemisorbed $CH_4$ into methyl radicals, creating weaker adsorption bonds between the metal catalyst and the methyl radical. This is part due to the unstable nature of the radicals, such that the methyl radical tends to readily combine with another radical to form a stable compound. For example, the two $CH_3$* formed in eq. 1 can combine to form ethane ($C_2H_6$).

The methane radicals' intermediaries formed during the methane splitting may also undergo induced dipole from the electromagnetic field(s) created, creating stabilization and increases splitting efficiency. Such an alignment induces stability, thereby reducing the energy required to split methane by shifting the thermodynamic equilibrium towards the radical until the methane conversion to carbon and hydrogen is complete.

Systems configured as disclosed herein can employ any number of common engineering solutions to assist in the separation of carbon and hydrogen generated from methane. For example, the systems may include purifiers that purify natural gas into methane before ingestion into the reaction components and/or further purifiers that remove any residual contaminants from the hydrogen that is generated in the reaction process.

The reaction chamber is where the process of the reaction, as outlined in the equations 1-5, occurs. The format of the reaction chamber can be determined by the catalyst type and the application of the magnetic field. There are multiple architectures that can support the application of such a field, including coils, plates, blades, tubes (including multiple diameter tubes in concentric arrangements), fans and the like.

The design of the reaction chamber, in some embodiments, may be aligned with the type of carbon to be separated from the methane, and can include at least one carbon capture and repository arrangement. For example, the type of carbon molecules, in terms of molecular weight, dimensions and other characteristics may influence the choice of grid, electrostatic attraction, semi-permeable membrane, cyclone, fan and/or fan assist, or other approaches to the removal of the carbon from the reaction chamber. This in turn may be complimented by at least one repository arrangement, where the specific types of carbon are stored as solids.

In some configurations, an application of an electromagnetic field can induce magnetic spin alignment of the dipoles in the catalyst and the methyl radical, thereby stabilizing the methyl radical intermediaries (such as those formed in Equations 1 to 3), and thereby strengthening the adsorbed bond between the radicals and metal catalyst. In some embodiments, the application of such an electromagnetic field can act to encourage the completion of the reactions described in Equations 4 and 5. Moreover, the stabilizing effect on the reaction reduces the activation energy requirements for each reaction from Equations 2-4. The type of reaction chamber design and implementation may further optimize this approach, such that the application of spin is achieved in an optimized manner. This may include, in some configurations, the use of high speed switching techniques for the energizing of the electromagnet—for example, using ultra-fast diodes and/or avalanche diodes as part of the switching circuitry, with associated control and management software systems.

In some embodiments, the sensors systems that are part of the reaction chamber and/or monitor the system inputs/outputs may provide data sets to a computer system, where the computer system uses the data with machine learning techniques to establish the appropriate parametrization of the operating control systems for desired system operations. This data can be stored in a database, digital ledger, or other repository which can also save predicted and actual outcomes of the processes. In some cases, this may include the creation of an immutable record of the process including, for example, the energy used to generate specific outputs along with any emissions. In this manner the system can provide an overall emission quality monitoring system to verify the operations, inputs, energy costs, and/or emissions associated with production of system outputs.

One mechanism that can be used to understand the process at the microscopic level is a vapor-liquid-solid (VLS) model. VLS methods are a mechanism for the growth of one-dimensional structures, such as nanowires, from chemical vapor deposition. A VLS models predicts how that one-dimensional structure is generated, with the model providing insights as to the understanding of the growth of carbon nanofibers from a carbon-containing precursor over solid catalysts. Such a model can be used by the control system to configure the reaction chamber to produce the growth of different carbon materials with different properties, types and/or characteristics (e.g., CNTs, Graphite, Graphene). A VLS model can also be used by the control system to grow silicon whiskers.

Using the VLS model, the control system can generate growth simulations of desired outputs by using the desired characteristics of the carbon produced in the reaction chamber. To do so, the control system may undertake a set of processes that conform to the VLS model, for example:

a. The carbon-containing gas precursor, e.g., a hydrocarbon (such as methane), adsorbs and dissociates in elemental carbon on the catalyst surface.
b. The carbon atoms dissolve into the bulk of the catalyst particles, giving rise to a liquid metastable carbide and diffuse within the particles.
c. The solid carbon precipitates at the backside of the catalyst particles, forming carbon nanostructures.

A modified version of these processes can use surface transport of carbon atoms, followed by carbon diffusion through the catalyst bulk as the rate-limiting step at the microscopic level, to predict the growth of carbon nanofilaments, carbon nanotubes, and/or graphene.

The kinetic parameters (pre-exponential factor, activation energy, and reaction order) of each intermediate elementary reaction step can be configured by the control system. In addition, the control system can apply a magnetic field to the bulk of catalyst or filler particles present within the bed of a fluidized bed reactor, which allows the fluidization of particles of lower sizes which are otherwise difficult to fluidize under normal conditions. This allows the use of catalyst of smaller dimensions, which can improve the efficiency of the reaction and provide more options in the type, size and morphology of the carbon nano-objects produced.

Micro-fine particles can be difficult to be fluidized, however application of a magnetic field can influence the fluidization of the bed by bringing down the pressure drop of the bed and/or changing the minimum fluidization velocity. Consider the following non-limiting examples:

(A) Effect of magnetic field strength on the pressure drop of the bed: A stable magnetic field with a strength of up to 24 kA/m has a magnetic effect on the microfine particles. This effect will weaken the inter-particle adhesion and the retention of microfine particles present within the trench of a fluidized bed reactor, thereby improving the fluidization performance of the bed. Such a magnetic field can be produced in a Helmholtz coil by any magnetic field generation system powered by a regulated power supply, which provides a stable current at a set voltage. Under the influence of a strong magnetic field, the length and strength of the magnetic chain of particles increases, making these structures agglomerated and tighter, and resulting in more orderly arrangements and better filling of the particles in the bed. Therefore, the permeability of the bed improves, and the overall pressure drop of the bed becomes smaller.

(B) Effect of magnetic field strength on the minimum fluidized gas velocity: In general, the minimum fluidized gas velocity is an inherent property of the particle during fluidization and is related to the nature of the particle (density, size, magnetic, etc.). With the addition of a magnetic field, the state of the micro-fine particles changes, causing them to agglomerate in a controlled manner to form magnetic chains. These magnetic chains further undergo agglomeration to form magnetic chain agglomerates. This changes the size of the particles involved in the fluidization of the bed, thereby changing the minimum fluidized gas velocity.

For example, carbon/silicon formed during the methane/silane pyrolysis can become agglomerated and affect the fluid dynamics of the bed. The same agglomeration can happen for catalyst used in the fluidized bed reactor.

Systems configured as described herein can perform pyrolysis using removable elements that can be replaced during operations. These removable elements, referred to as "catalyst units", contain catalyst, the reaction chambers in which pyrolysis occurs, an input mechanisms (such as an input valve or line), and one or more output mechanisms for the cracked molecules. Preferably, the catalyst units take the form of a metallic cylinder, smaller in diameter than the work-piece into which the catalyst unit is inserted, such that the work-piece can contain multiple catalyst units in operation at the same time. This approach provides a system whereby the catalyst units may be removed and replaced when the efficiency of the system, or any individual catalyst unit, approaches or falls below a threshold (as detected by the sensors). One advantage of this modular approach is the ability to provide plug in different catalyst types and volumes in each unit, where the different units can have different characteristics which can change the production of the desired output. For example, if the system is configured to output two different specific variations of carbon black, the catalyst units input into the work-piece could have different types of catalysts (e.g., one catalyst unit has a first catalyst type, resulting in a first output which is a first variation of carbon black; the second catalyst unit has a second catalyst type, resulting in a second output which is a second variation of carbon black). Similarly, in some configurations, the desired output may be formed as a combination of one or more catalyst units. Continuing with the previous example, if a desired output were a combination of the previously generated first output and second output, the system could combine the first and second outputs together to form the desired output. For example, the system may produce a rare-earth element and a transition metal, resulting in vertically aligned CNTs. Similarly, by changing the type of catalyst, more complex carbon nano objects can be produced, and different variations/combinations of gas outputs can be generated. In configurations where the different catalyst units inserted into the work-piece contain different catalysts, and produce different outputs, the system will need different exit lines for the outputs to leave the respective catalyst units.

Each individual catalyst unit's input gas speed, gas supply and mixtures, induction coil heat level, and electromagnetic levels can be controlled via a control system. The control system can be on an individual catalyst unit level (i.e., a controller specific to that catalyst unit) and/or on a system level (i.e., where a master control system/computer controls the operations of all of the catalyst units, or a combination of a master control with subsidiary controls). Each catalyst unit can have it own set of sensors which communicate with the control system(s) to track cracking efficiency, pressure, amount of remaining catalyst, etc. Preferably, these sensors are built into the catalyst units, though in some configurations the sensors may be separate from the catalyst units which the sensors monitor.

The work-piece into which the catalyst units are inserted can have a single coil around the work-piece, which can be used to generate an electromagnetic field which affects all catalyst units stored within the work-piece. Alternatively, the work-piece can have a number of coils stored within it, where each coil is configured such that catalyst units can be removed and the coil will remain fixed in the work-piece (for example, when the catalyst within a catalyst unit is below a predefined threshold, or when the efficiency of the catalyst unit falls below a desired threshold). A user (or if automated, the system) can then replace the removed/exhausted catalyst unit with a new catalyst unit by inserting into the new catalyst unit into the now empty coil while operation of the other catalyst units (and their associated coils) continues.

FIG. 1 illustrates an example system 102 of a catalyst unit 106 with an electric heating coil 116 and catalyst 114. As illustrated, input gases 104 are received by the catalyst unit 106 and outputs 120 (such as gas and carbon) are output via an output line 122 from the catalyst unit 106. This example system uses a fluidized catalyst 114 using gas pressures (i.e., the pressure from the input gasses 104), where the input gas 104 is pushed through a fluidization plate 108 (the fluidization plate 108 is also illustrated from a top perspective 110), resulted in disbursed input gas 112. The example system 102 uses heat from the electric coil 116 to cause pyrolysis within a reaction chamber 118 (also known as a hot zone), resulting in outputs 120 contained within the catalyst unit 106. This system 102 is less efficient at ensuring the maximum surface area of the catalyst 114 is made available for the best cracking efficiency than the inductive configurations disclosed herein.

Figure 2:
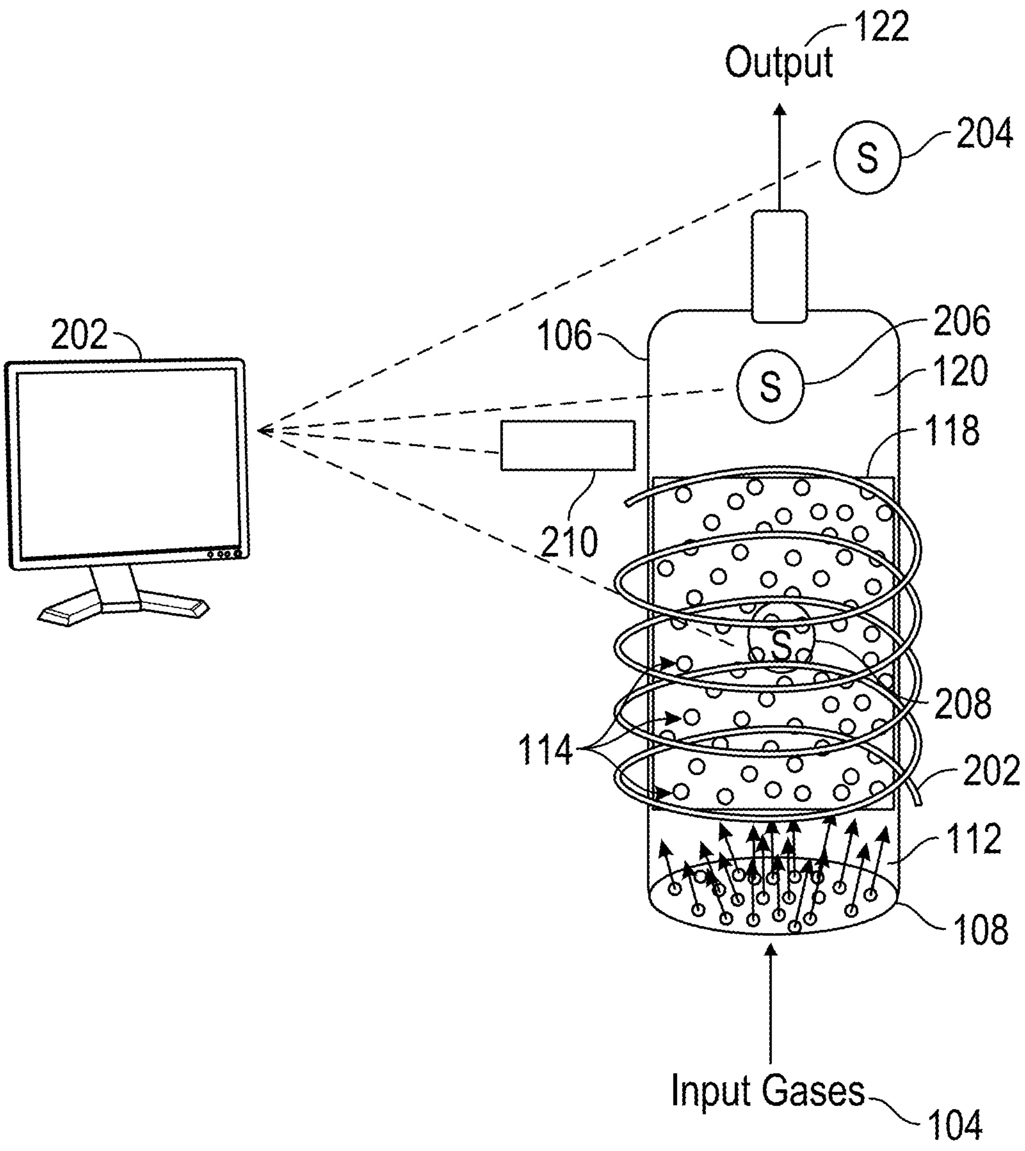
FIG. 2 illustrates an example of a fluidized bed reactor with an inductive heating coil and catalyst.

FIG. 2 illustrates an example of a system with a catalyst unit 106 with an inductive heating coil 202 and sensors 204, 206, 208, where the heating coil 202 is controlled by an oscillator 210, which in turn is controlled by a control system 202 (e.g., a computer). Similar to the example of FIG. 1, input gasses 104 are received and disbursed into the catalyst unit 106 using a fluidization plate 108. The system then causes pyrolysis within a reaction chamber 118, resulting in outputs 120, which are also output via an output line 122 or other output mechanism. The sensors 204, 206, 208 can provide information to the control system 202 regarding the temperature, pressure, flow rates of gases, magnetic flux, electrical field intensity, efficiency of the process, how much catalyst 114 remains in the catalyst unit 106, how much output 120 has been generated, how much output gas 122 is leaving the system, etc.

Figure 3:
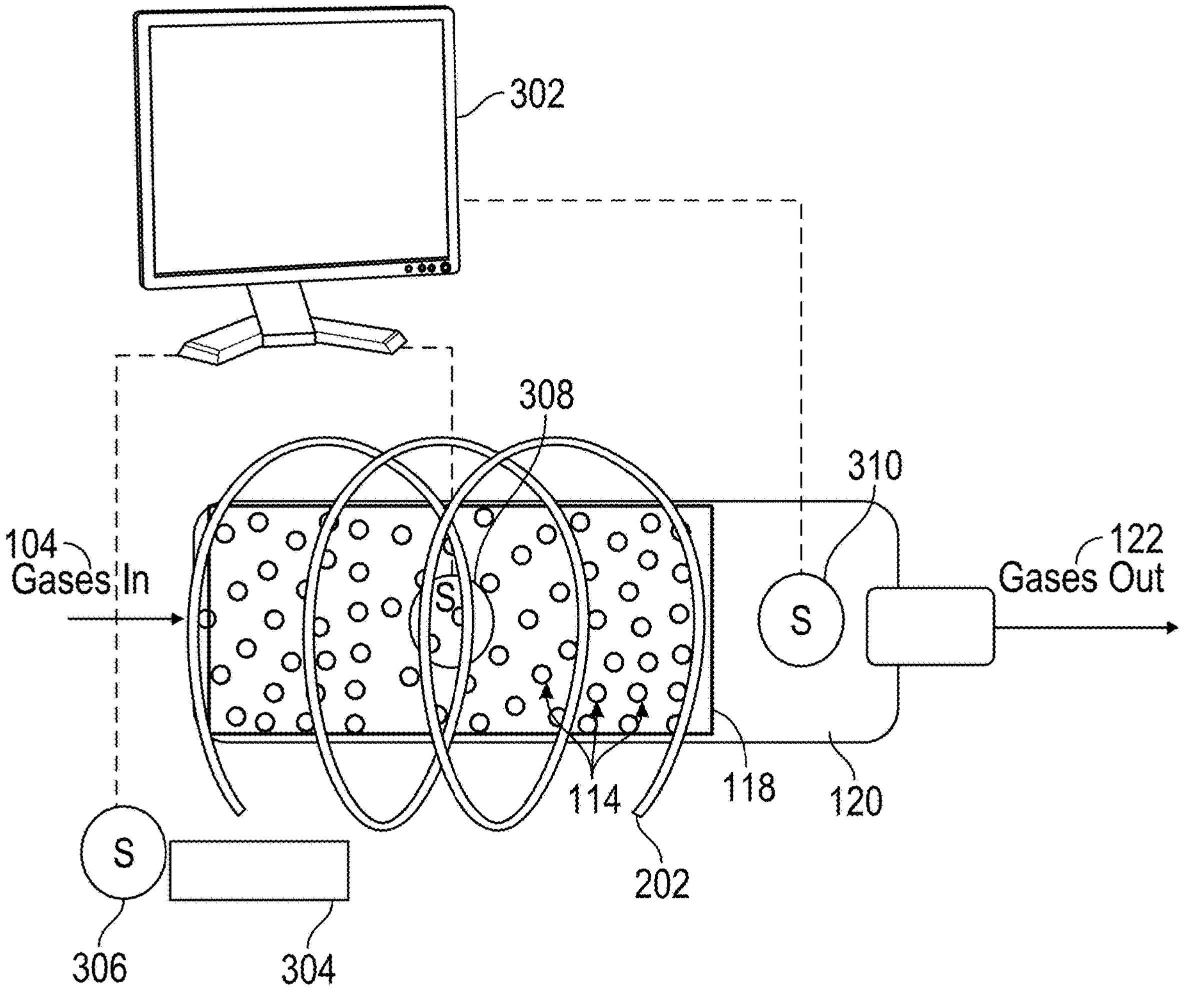
FIG. 3 illustrates an example of a fluidized bed reactor using electro-magnetic agitation to fluidize the catalyst.

FIG. 3 illustrates an example of a fluidized bed reactor using electro-magnetic agitation to fluidize the catalyst. This system has a catalyst unit which does not use gas pressure to fluidize the catalyst 114, but instead uses the varying polarity realized from the oscillating electro-magnetic energy from the induction heater. As in FIG. 2, this system uses an inductive coil 202 controlled by an oscillator 304, and also uses sensors 306, 308, 310 in communication with a control system 302. As illustrated, input gas 104 enters enter horizontally from the side and through the catalyst 114, where the catalyst 114 is dispersed and fluidized using an electromagnetic field generated by the coil 202, where the electromagnetic field is created using AC current driven by the oscillator 304. Similar to the example of FIG. 2, pyrolysis occurs within a reaction chamber 118, resulting in outputs 120, which are also output via an output line 122 or other output mechanism. The sensors 306, 308, 310 can provide information to the control system 302 regarding the temperature, pressure, flow rates of gases, magnetic flux, electrical field intensity, efficiency of the process, how much catalyst 114 remains in the catalyst unit, how much output 120 has been generated, how much output gas 122 is leaving the system, etc.

Figure 4:
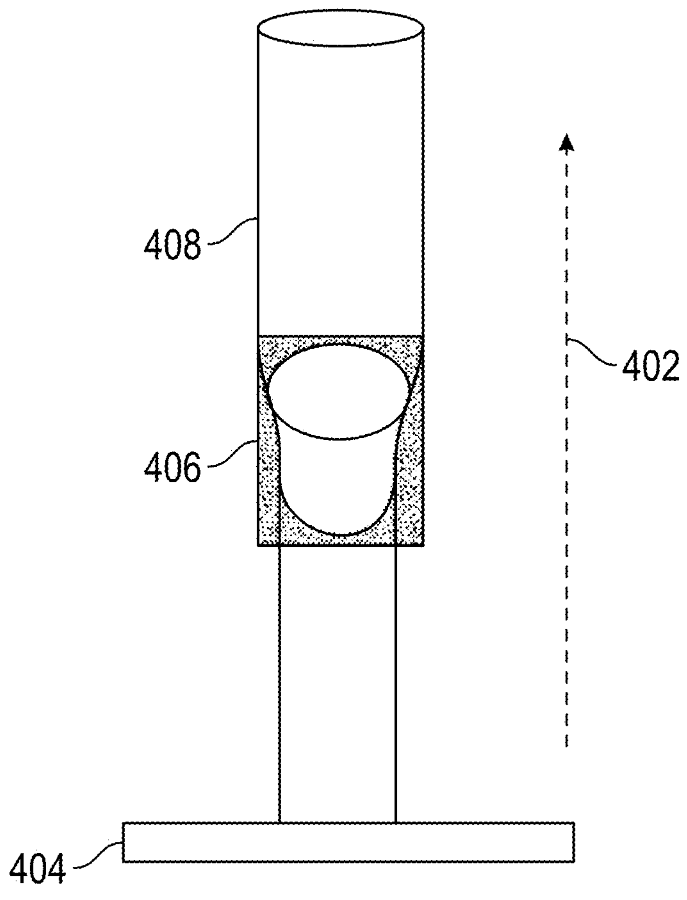
FIG. 4 illustrates an example magnetic fields and Carbon Nano Tubes (CNTs) showing how the magnetic field influences the growth of Carbon nanotubes.
Figure 5:
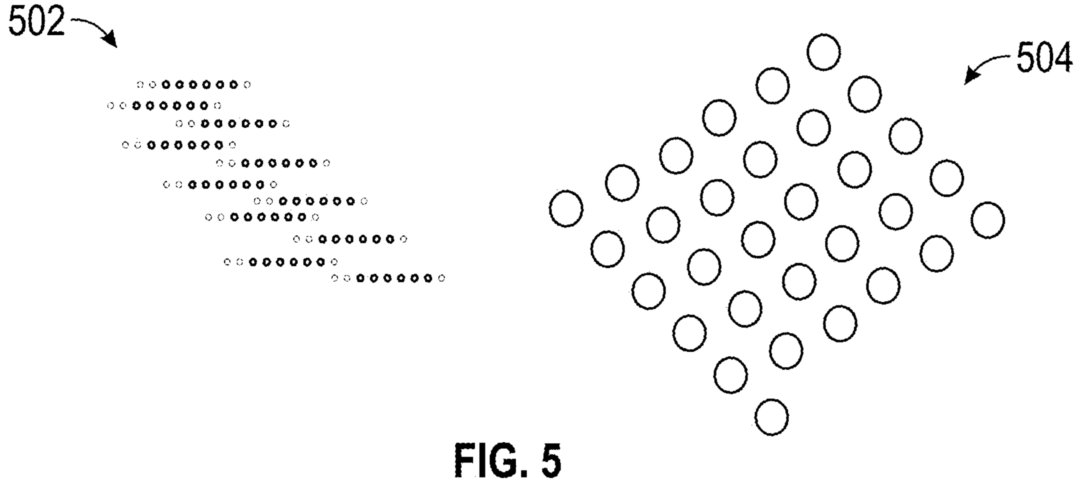
FIG. 5 illustrates an example of particles before and after the influence of a magnetic field.

FIG. 4 illustrates an example of magnetic field and CNTs showing how the magnetic field influences the growth of carbon nanotubes, as described herein. As illustrated, a magnetic field 402, applied perpendicular to the catalyst substrate 404 causes carbon atoms to precipitate at the interface of the catalyst particle 406 to form the carbon nanotubes 408, creating a compressive force that carries and causes the molten catalyst particle 406 to become like an inverted cone FIG. 5 illustrates an example of particles before and after the influence of a magnetic field, showing the clustering of smaller sub-micron size catalyst particles to reach a critical size so that it comes within the required Geldart sizes for fluidization. Without a magnetic field when there are particles 502 in the bed (either due to the catalyst or due to a formed carbon/silicon product) during the flow of gas to fluidize the bed, smaller particles will move at the top of the bed while the larger particles will remain static at the bottom of the bed, causing channeling of the gas flow. Such a bed will show almost no expansion, and the pressure drop will be less than the bed weight, indicating that the entire bed was not fluidized. By turning on the external magnetic field 504, the large particles will fragment due to collisions with the magnetic particles, and the resulting smaller particles will participate in the fluidization of the bed, thereby achieving at least a 4 to 5 fold reduction in the minimum fluidization velocity (U mf). Under the external magnetic field 504, the resulting particles are no longer as clustered together, but are instead dispersed within the reaction chamber.

By reducing the size of generated carbon/silicon products, the resulting smaller products allows their continuous removal. The product gas (hydrogen in case of methane/silane pyrolysis) and/or carrier gas (e.g., any inert gas like nitrogen or argon) can carry the solid carbon/silicon products to a filtration system (e.g., bag filter, cyclone, electrostatic precipitator, water-columns, etc.) to remove the solid products from the system. Based on the type, form, purity, and property of material to be separated, an appropriate magnetic, electrical, and/or electromagnetic field can be applied to the reaction chamber.

Figure 6:
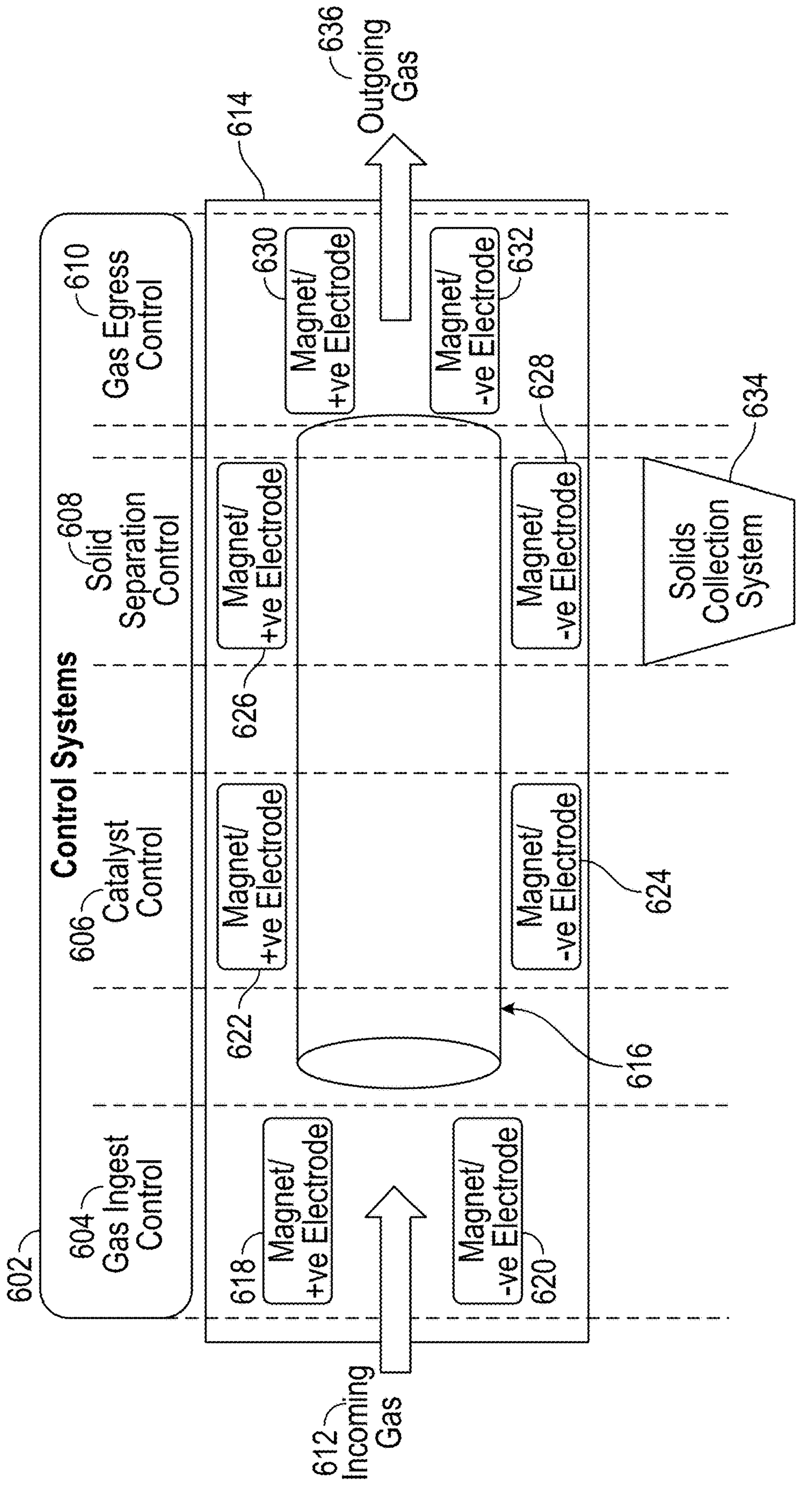
FIG. 6 illustrates an example of control systems controlling a reactor, magnets, and electrodes.

FIG. 6 illustrates an example of control systems 602 controlling a reactor, magnets, and electrodes. FIG. 6 illustrates a system with a central control system 602, with various sub-control systems 604, 606, 608, 610 managing magnetic fields for specific portions of the manufacturing process. As illustrated, the system can incorporate magnetic and electrical fields in any arrangement to separate solids from a gas input 612, for example separating carbon from methane to create hydrogen gas and solid carbon in the form of carbon nano tubes or other carbon formats. Each sub-control system 604, 606, 608, 610 is associated with one or more magnets and/or electrodes. For example, the gas ingest control 604 is associated with magnets 618, 620 which assist in the receiving of incoming gas 612. The catalyst control 606 controls magnets 622, 624 which create an electromagnetic field influencing the gas/catalyst mixture inside the reaction chamber 616. The solid separation control 608 controls magnets 626, 628 associated with moving solid outputs to a solid collection system 634. A gas egress control 610 controls magnets 630, 632 associated with moving the output gasses 636 to an exit line or other output mechanism. In some configurations, the magnets can make use of an electrode, whereas in other configurations the electrode may be removed.

Figure 7A:
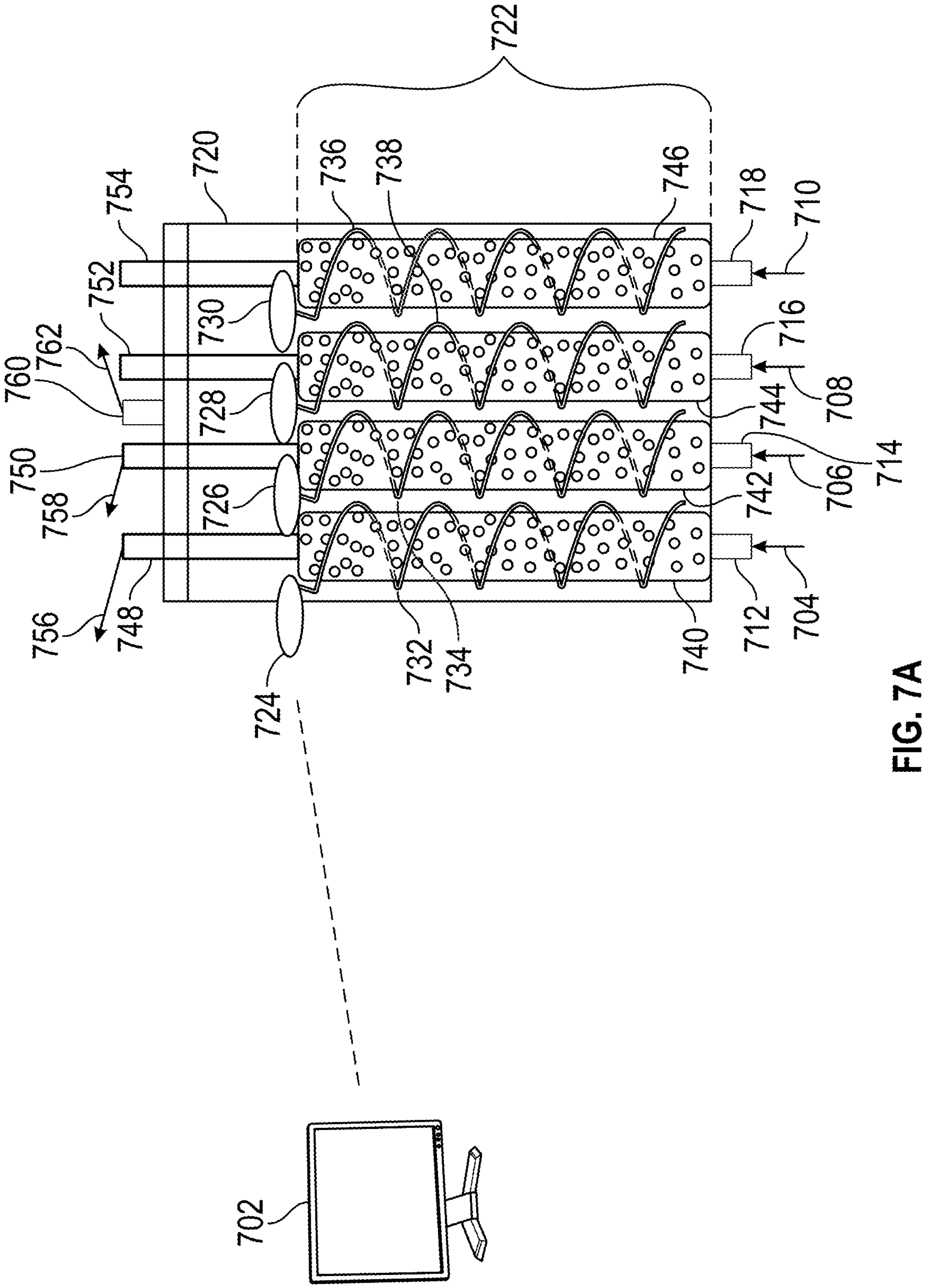
FIG. 7A illustrates an example of a system having multiple removable containers storing catalyst, each of which has a respective induction coil.

FIG. 7A illustrates an example of a system having a control system 702 and a work-piece 720 containing multiple removable containers 722, 740, 742, 744, 746 storing catalyst (catalyst units), each of which has: a respective induction coil 732, 734, 736, 738 with an accompanying oscillator 724, 726, 728, 730; a respective input line 712, 714, 716, 718; and a respective output line 748, 750, 752, 754. The catalyst within the removable containers 740, 742, 744, 746 can be the same or different catalyst between each of the containers 740, 742, 744, 746, such that all of the containers can use a single form of catalyst, all the containers can contain different types of catalysts, or there can be some containers (but not all) which share a common catalyst (e.g., two containers 740, 742 contain catalyst A, and two containers 744, 746 contain catalyst B). While four containers 740, 742, 744, 746 are illustrated within the multiple removable containers 722, such a number is exemplary only, and systems configured as disclosed herein can have more or fewer containers. As input gasses 704, 706, 708, 710 are received by the input lines 712, 714, 716, 718, the control system 702 can cause the oscillators 724, 726, 728, 730 to generate magnetic fields within the catalyst units 740, 742, 744, 746, causing pyrolysis. The resulting outputs 756, 758, 762, are removed from the system using the one or more output mechanisms 748, 750, 752, 754. In this example, the outputs which would have been output from output lines 752, 754 are being combined together, resulting in a combined output 762 from a combined output line 760.

In FIG. 7A the control system 702 manages each step of the process. In this example, the input gas 704, 706, 708, 710 enters by the input lines 712, 714, 716, 718 which connect to the catalyst units 740, 742, 744, 746 at the bottom. Each catalyst unit in removable and can be replaced with a new catalyst once the old one is spent. Each catalyst unit can have a different catalyst, such that different carbon black and carbon nano-object specifications can be produced by the control system controlling which catalyst units deploy their catalyst, the timing of that release, and the amounts released. The gas cracks or splits into its elements (which for hydrocarbons is solid carbon and hydrogen), fluidization is achieved using electromagnetic energy, heat is produced by induction, the gas cracks at a certain cracking efficiency due to the heat, catalyst type, electromagnetic energy, and volume of gas passing through each unit 740, 742, 744, 746 per second, and the gas and solid exits at the top 748, 750, 752, 754 of the unit 740, 742, 744, 746.

Figure 7B:
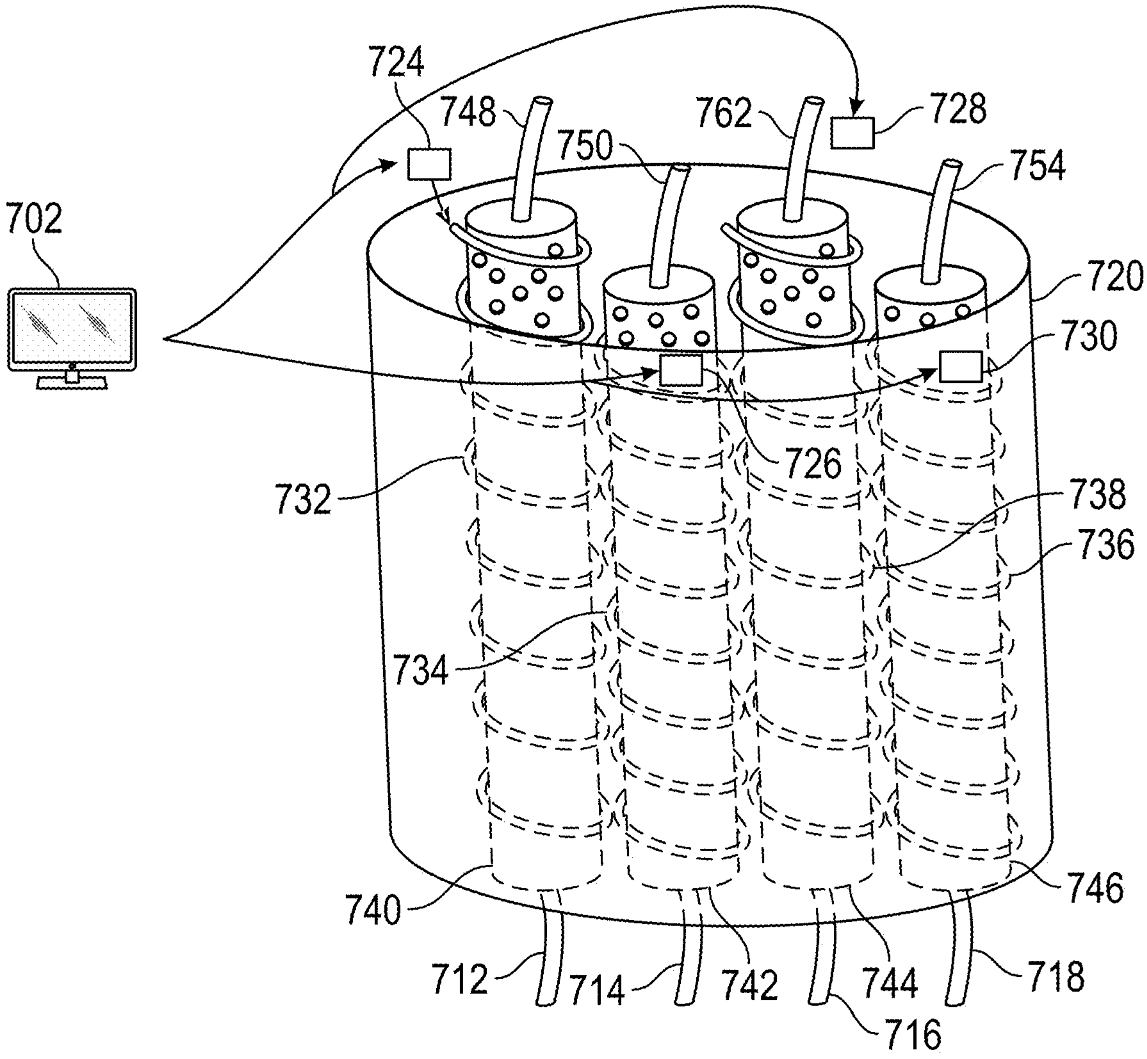
FIG. 7B illustrates an example perspective view of the system of FIG. 7A.

FIG. 7B illustrates an example perspective view of the system of FIG. 7A where the removeable catalyst units and set coils are in a circular container.

Figure 8:
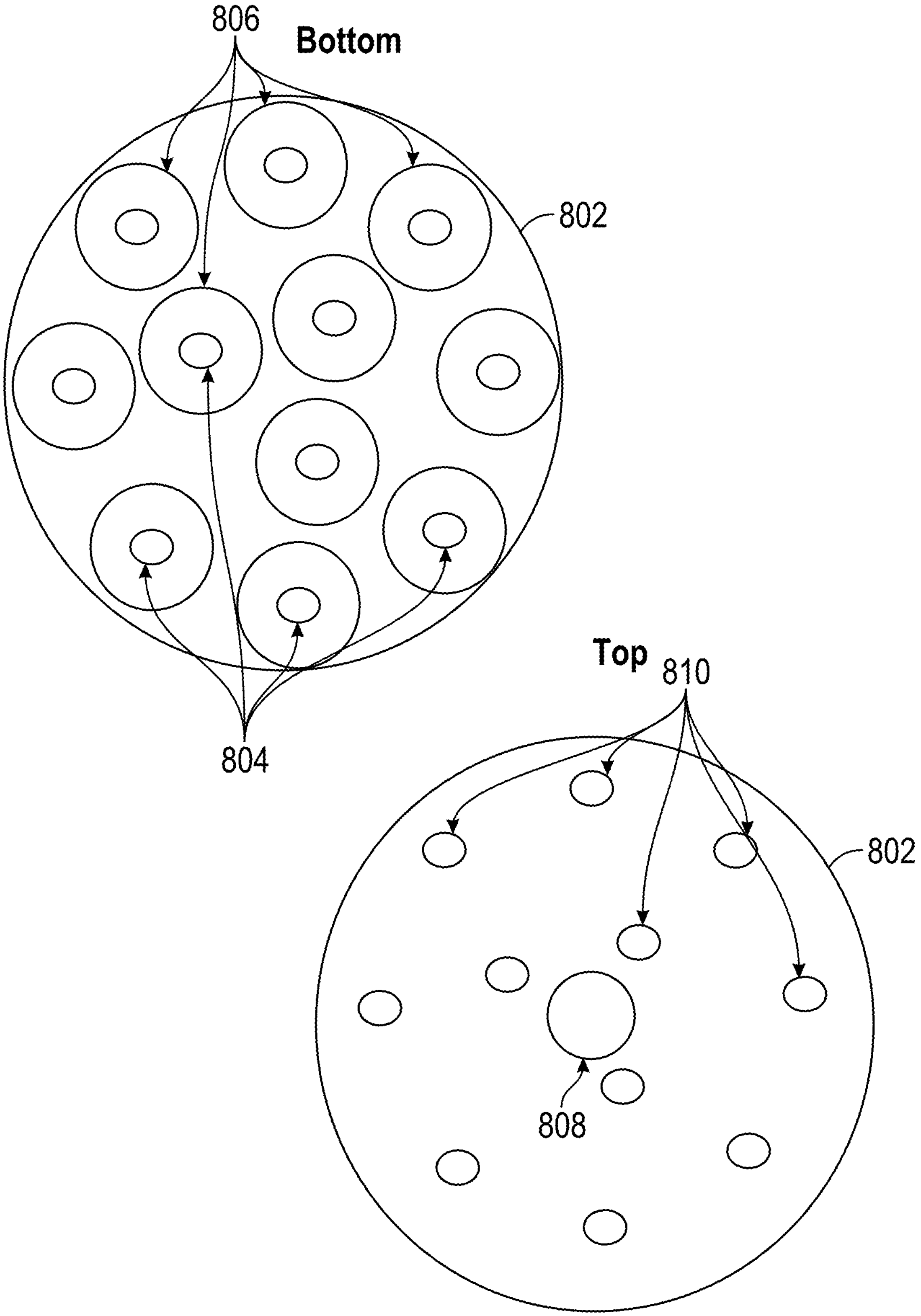
FIG. 8 illustrates a view of a system having multiple removable containers from above and below.

FIG. 8 illustrates views of a work-piece 802 having multiple removable containers 806 (catalyst units) from above and below. Systems configured as described herein have more or fewer units than illustrated. From the bottom, one can see the input lines 804 connecting to the catalyst units 806. From the top, one can see the output lines 810 associated with each individual catalyst unit 806, as well as a larger, combined output line 808.

Figure 9A:
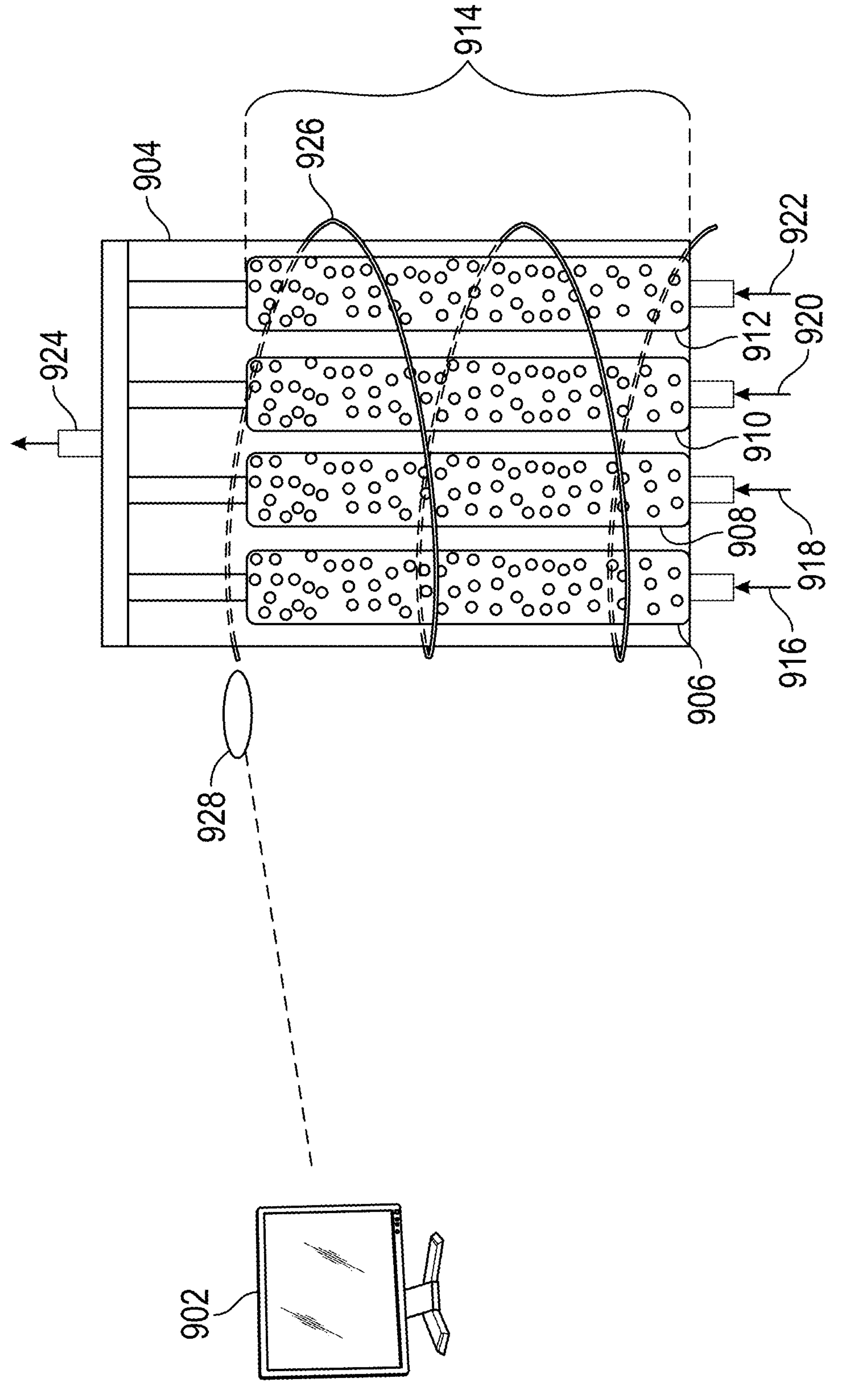
FIG. 9A illustrates an example of a system having multiple removable containers storing catalyst, where a single induction coil applies an electromagnetic field to all of the containers.

FIG. 9A illustrates an example of a system where a work-piece 904 having multiple removable containers (catalyst units) 906, 908, 910, 912 storing catalyst, and where a single induction coil 926 (controlled by a single oscillator 928) applies an electromagnetic field to all of the containers 906, 908, 910, 912. Like FIGS. 7A and 7B, the catalyst within the removable containers 906, 908, 910, 912 can be the same or different catalyst between each of the containers 906, 908, 910, 912, such that all of the containers can use a single form of catalyst, all the containers can contain different types of catalysts, or there can be some containers (but not all) which share a common catalyst (e.g., two containers 906, 908 contain catalyst A, and two containers 910, 912 contain catalyst B). Like FIGS. 7A and 7B, here the process is controlled by a control system 902, and the gas 916, 918, 920, 922 enters the catalyst units 906, 908, 910, 912 at the bottom via a gas input, fluidization is achieved using electromagnetic energy, heat is produced using induction, and the gas cracks due to heat, catalyst type, the volume of gas passing through each unit, and electromagnetic energy. The resulting two or more elements then exit at the top 924 of the unit via an output mechanism. Note that because the system illustrated in FIG. 9A has a single coil 926 (rather than individual coils as illustrated in FIG. 7A and FIG. 7B), it does not have the flexibility to produce varying carbon black specifications. However, the system illustrated in FIG. 9A can still be used to scale the volume of outputs produced, depending on how many catalyst units 906, 908, 910, 912 the work-piece 904 is able to contain, and if the user of the system inserts the maximum number ("n") of catalyst units or less than "n" catalyst units.

Figure 9B:
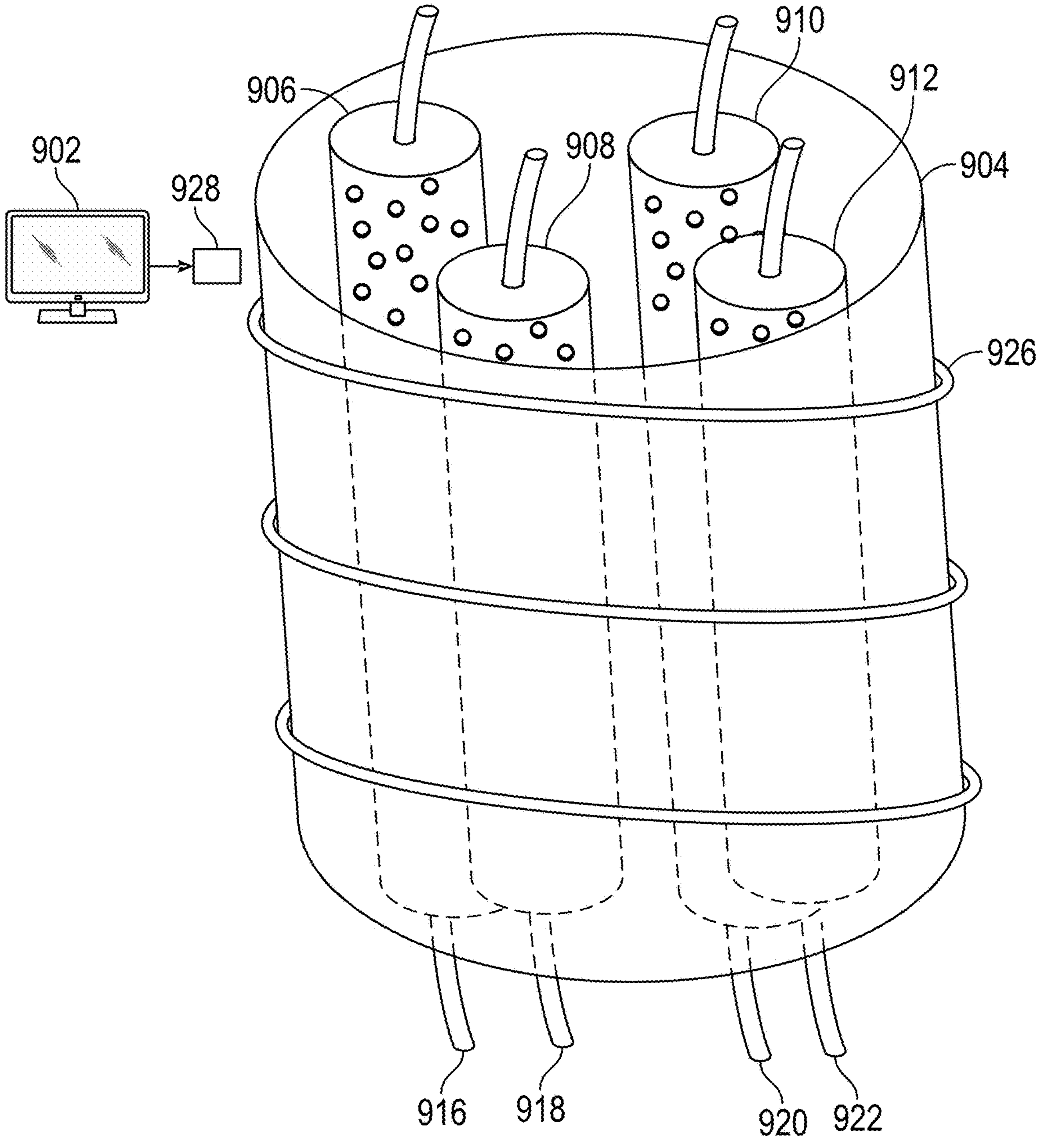
FIG. 9B illustrates an example perspective view of the system of FIG. 9A.

FIG. 9B illustrates an example perspective view of the system of FIG. 9A.

Figure 10:
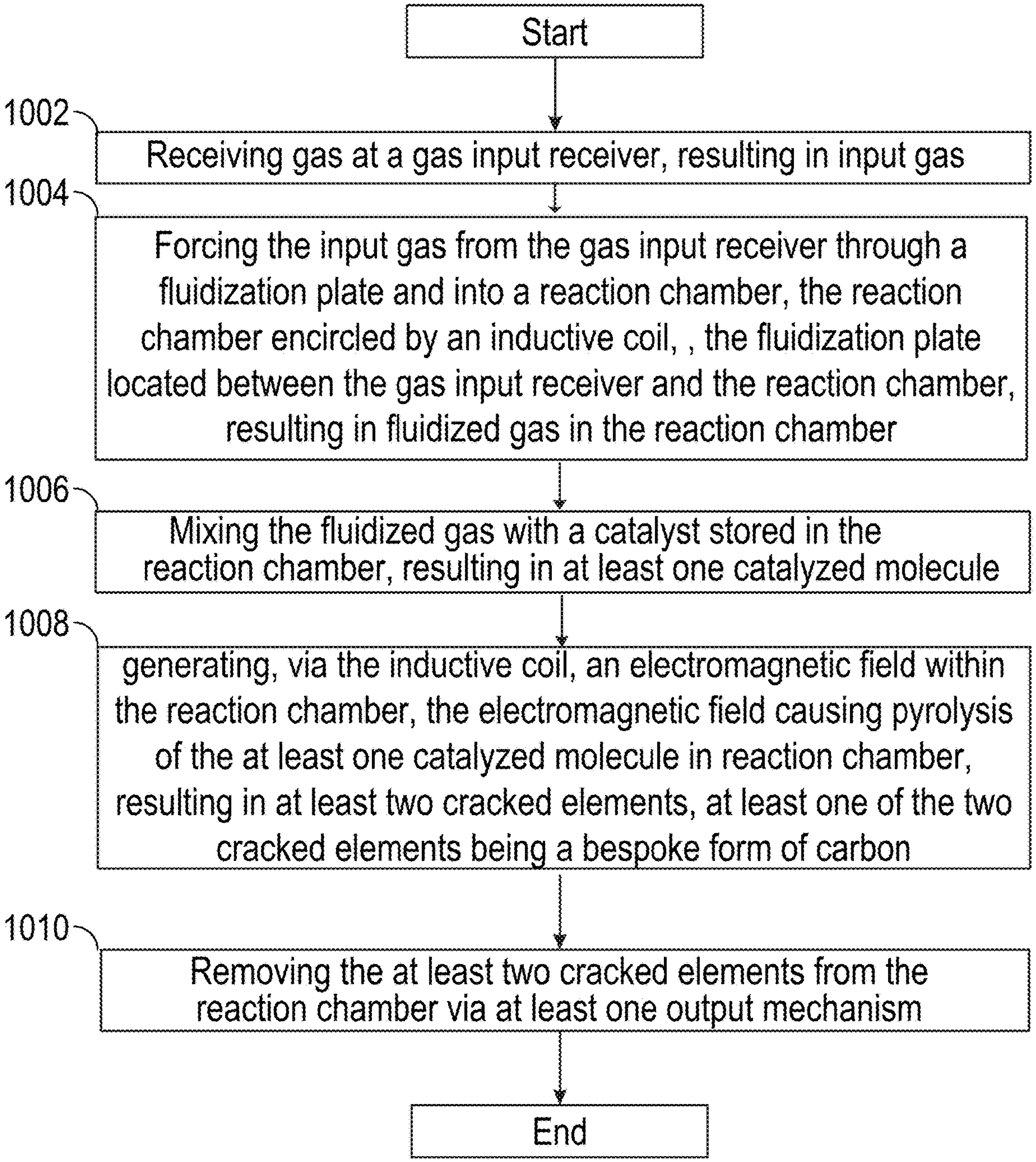
FIG. 10 illustrates an example method embodiment.

FIG. 10 illustrates an example method embodiment. A system configured to practice the illustrated method can receive gas at a gas input receiver, resulting in input gas (1002), and force the input gas from the gas input receiver through a fluidization plate and into a reaction chamber, the fluidization plate located between the gas input receiver and the reaction chamber, resulting in fluidized gas in the reaction chamber (1004). The system can then mix the fluidized gas with a catalyst stored in the reaction chamber, resulting in at least one catalyzed molecule (1006) and crack the at least one catalyzed molecule via pyrolysis in reaction chamber, resulting in at least two cracked elements (1008). The system can then remove the at least two cracked elements from the reaction chamber via at least one output mechanism (1010).

In some configurations an inductive coil can encircle the reaction chamber, wherein during operation of the reaction chamber the inductive coil creates an electromagnetic field. In such configuration, during operation at least one processor can communicate with an oscillator to cause the inductive coil to create the electromagnetic field using an alternating current, where the electromagnetic field causes the pyrolysis. In addition, the electromagnetic field can interact with the catalyst prior to the mixing of the fluidized gas with the catalyst, resulting in alternating polarity of the catalyst within the reaction chamber.

In some configuration, the at least one processor can communicate with at least one sensor in the reaction chamber to determine a rate of generating the at least two cracked elements. In such configurations, during operation the at least one processor can communicate with the at least one sensor to determine a remaining amount of the catalyst within the reaction chamber.

In some configurations, the at least one output mechanism can include: a solids collection system; and an outgoing gas receptacle.

In some configurations, the gas input receiver comprises a gas entry line.

In some configurations, the gas can include hydrocarbons, and the at least two cracked elements can include carbon black and at least one resulting gas.

In some configurations, the illustrated method can further include: forcing the gas into at least one additional reaction chamber containing additional catalyst, resulting in additional fluidized gas in the at least one additional reaction chamber; mixing the additional fluidized gas with the additional catalyst, resulting in at least one additional catalyzed molecule; cracking the at least one additional catalyzed molecule via pyrolysis in the at least one additional reaction chamber, resulting in at least two additional cracked elements; and removing the at least two additional cracked elements from the reaction chamber via at least one additional output mechanism, wherein the catalyst of the reaction chamber and the additional catalyst of the at least one additional reaction chamber are distinct such that the at least two cracked elements produced by the reaction chamber are distinct from the at least two additional cracked elements produced by the at least one additional reaction chamber.

Figure 11:
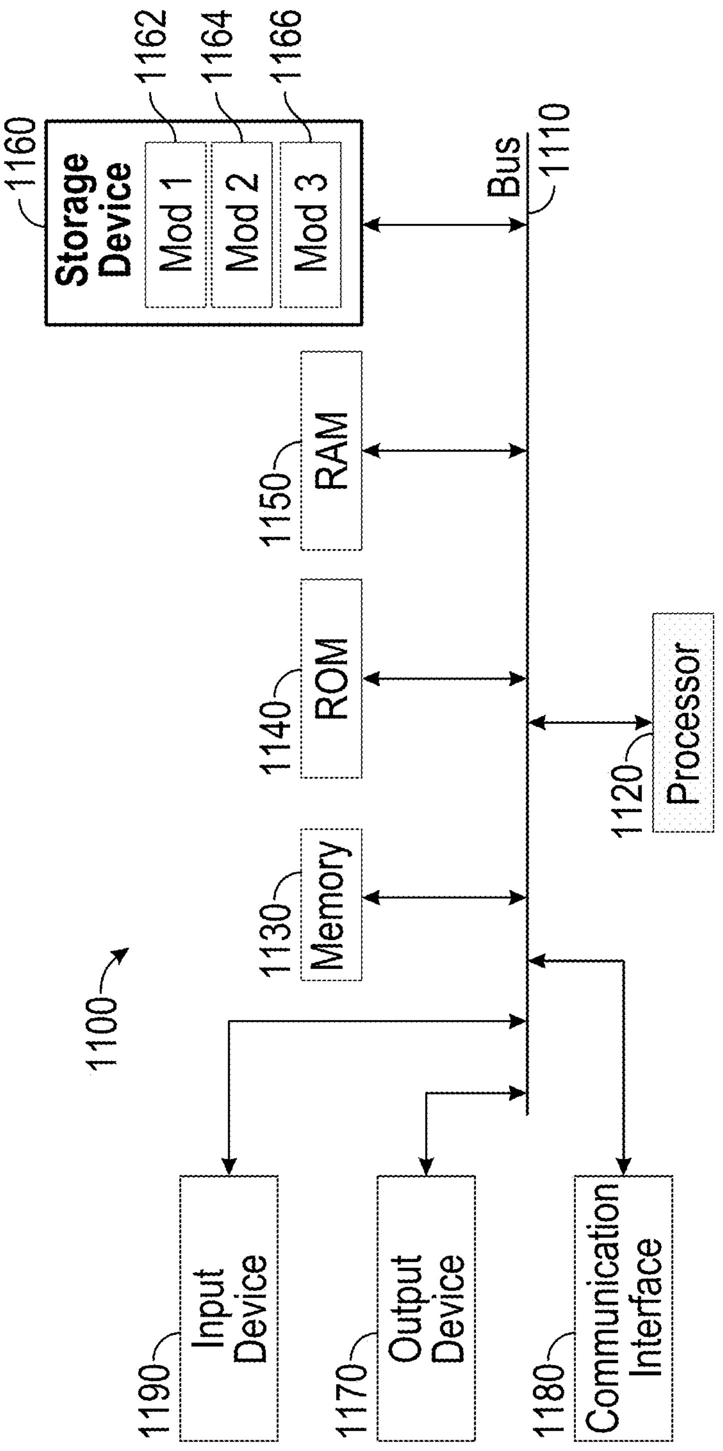
FIG. 11 illustrates an example computer system.

With reference to FIG. 11, an exemplary system includes a general-purpose computing device 1100, including a processing unit (CPU or processor) 1120 and a system bus 1110 that couples various system components including the system memory 1130 such as read-only memory (ROM) 1140 and random-access memory (RAM) 1150 to the processor 1120. The system 1100 can include a cache of high-speed memory connected directly with, in close proximity to, or integrated as part of the processor 1120. The system 1100 copies data from the memory 1130 and/or the storage device 1160 to the cache for quick access by the processor 1120. In this way, the cache provides a performance boost that avoids processor 1120 delays while waiting for data. These and other modules can control or be configured to control the processor 1120 to perform various actions. Other system memory 1130 may be available for use as well. The memory 1130 can include multiple different types of memory with different performance characteristics. It can be appreciated that the disclosure may operate on a computing device 1100 with more than one processor 1120 or on a group or cluster of computing devices networked together to provide greater processing capability. The processor 1120 can include any general-purpose processor and a hardware module or software module, such as module 1 1162, module 2 1164, and module 3 1166 stored in storage device 1160, configured to control the processor 1120 as well as a special-purpose processor where software instructions are incorporated into the actual processor design. The processor 1120 may essentially be a completely self-contained computing system, containing multiple cores or processors, a bus, memory controller, cache, etc. A multi-core processor may be symmetric or asymmetric.

The system bus 1110 may be any of several types of bus structures including a memory bus or memory controller, a peripheral bus, and a local bus using any of a variety of bus architectures. A basic input/output (BIOS) stored in ROM 1140 or the like, may provide the basic routine that helps to transfer information between elements within the computing device 1100, such as during start-up. The computing device 1100 further includes storage devices 1160 such as a hard disk drive, a magnetic disk drive, an optical disk drive, tape drive or the like. The storage device 1160 can include software modules 1162, 1164, 1166 for controlling the processor 1120. Other hardware or software modules are contemplated. The storage device 1160 is connected to the system bus 1110 by a drive interface. The drives and the associated computer-readable storage media provide nonvolatile storage of computer-readable instructions, data structures, program modules and other data for the computing device 1100. In one aspect, a hardware module that performs a particular function includes the software component stored in a tangible computer-readable storage medium in connection with the necessary hardware components, such as the processor 1120, bus 1110, display 1170, and so forth, to carry out the function. In another aspect, the system can use a processor and computer-readable storage medium to store instructions which, when executed by a processor (e.g., one or more processors), cause the processor to perform a method or other specific actions. The basic components and appropriate variations are contemplated depending on the type of device, such as whether the device 1100 is a small, handheld computing device, a desktop computer, or a computer server.

Although the exemplary embodiment described herein employs the hard disk 1160, other types of computer-readable media which can store data that are accessible by a computer, such as magnetic cassettes, flash memory cards, digital versatile disks, cartridges, random access memories (RAMs) 1150, and read-only memory (ROM) 1140, may also be used in the exemplary operating environment. Tangible computer-readable storage media, computer-readable storage devices, or computer-readable memory devices, expressly exclude media such as transitory waves, energy, carrier signals, electromagnetic waves, and signals per se.

To enable user interaction with the computing device 1100, an input device 1190 represents any number of input mechanisms, such as a microphone for speech, a touch-sensitive screen for gesture or graphical input, keyboard, mouse, motion input, speech and so forth. An output device 1170 can also be one or more of a number of output mechanisms known to those of skill in the art. In some instances, multimodal systems enable a user to provide multiple types of input to communicate with the computing device 1100. The communications interface 1180 generally governs and manages the user input and system output. There is no restriction on operating on any particular hardware arrangement and therefore the basic features here may easily be substituted for improved hardware or firmware arrangements as they are developed.

The technology discussed herein refers to computer-based systems and actions taken by, and information sent to and from, computer-based systems. One of ordinary skill in the art will recognize that the inherent flexibility of computer-based systems allows for a great variety of possible configurations, combinations, and divisions of tasks and functionality between and among components. For instance, processes discussed herein can be implemented using a single computing device or multiple computing devices working in combination. Databases, memory, instructions, and applications can be implemented on a single system or distributed across multiple systems. Distributed components can operate sequentially or in parallel.

Use of language such as "at least one of X, Y, and Z," "at least one of X, Y, or Z," "at least one or more of X, Y, and Z," "at least one or more of X, Y, or Z," "at least one or more of X, Y, and/or Z," or "at least one of X, Y, and/or Z," are intended to be inclusive of both a single item (e.g., just X, or just Y, or just Z) and multiple items (e.g., {X and Y}, {X and Z}, {Y and Z}, or {X, Y, and Z}). The phrase "at least one of" and similar phrases are not intended to convey a requirement that each possible item must be present, although each possible item may be present.

The various embodiments described above are provided by way of illustration only and should not be construed to limit the scope of the disclosure. Various modifications and changes may be made to the principles described herein without following the example embodiments and applications illustrated and described herein, and without departing from the spirit and scope of the disclosure. For example, unless otherwise explicitly indicated, the steps of a process or method may be performed in an order other than the example embodiments discussed above. Likewise, unless otherwise indicated, various components may be omitted, substituted, or arranged in a configuration other than the example embodiments discussed above.

Further aspects of the present disclosure are provided by the subject matter of the following clauses.

A system comprising: a reaction chamber, the reaction chamber having a cylindrical shape, the reaction chamber containing a catalyst; a fluidization plate having two sides, a first side of the fluidization plate being tangibly connected to a first end of the reaction chamber; a gas input receiver tangibly connected to a second side of the fluidization plate; at least one output mechanism tangibly connected to a second end of the reaction chamber; and an inductive coil encircling the reaction chamber, wherein during the operation of the system the inductive coil creates an electromagnetic field, wherein, during operation of the system: hydrocarbon gas is received at the gas input receiver, resulting in input gas; the input gas is forced through the fluidization plate, resulting in fluidized gas in the reaction chamber; the fluidized gas mixes with the catalyst, resulting in at least one catalyzed molecule; the at least one catalyzed molecule undergo pyrolysis, resulting in at least two cracked elements; and the at least two cracked elements are removed from the system via the at least one output mechanism, at least one of the two cracked elements being a bespoke form of carbon in a solid form.

The system of any preceding clause, further comprising: at least one processor; and an oscillator electrically connected to the inductive coil; wherein, during the operation of the system: the at least one processor communicates with the oscillator to cause the inductive coil to create the electromagnetic field using alternating current; and the electromagnetic field causes the pyrolysis, thereby creating a fluidizing affect without the use of gases.

The system of any preceding clause, further comprising: at least one processor; and a plurality of sensors, wherein, during the operation of the system: the at least one processor communicates with at least one sensor in the plurality of sensors to determine a rate of generating the at least two cracked elements.

The system of any preceding clause, wherein, during the operation of the system: the at least one processor communicates with the at least one sensor in the plurality of sensors to determine a remaining amount of the catalyst within the reaction chamber.

The system of any preceding clause, wherein the at least one output mechanism comprises: a solids collection system; and an outgoing gas receptacle.

The system of any preceding clause, wherein the gas comprises hydrocarbons, and wherein the at least two cracked elements further comprise at least one resulting gas.

The system of any preceding clause, further comprising: at least one additional reaction chamber containing additional catalyst; at least one additional gas input; and at least one additional output mechanism configured to output at least two additional cracked elements from the at least one additional reaction chamber, wherein the catalyst of the reaction chamber and the additional catalyst of the at least one additional reaction chamber are distinct, such that the at least two cracked elements produced by the reaction chamber are distinct from the at least two additional cracked elements produced by the at least one additional reaction chamber.

A method comprising: receiving gas at a gas input receiver, resulting in input gas; forcing the input gas from the gas input receiver through a fluidization plate and into a reaction chamber, the reaction chamber encircled by an inductive coil, the fluidization plate located between the gas input receiver and the reaction chamber, resulting in fluidized gas in the reaction chamber; mixing the fluidized gas with a catalyst stored in the reaction chamber, resulting in at least one catalyzed molecule; generating, via the inductive coil, an electromagnetic field within the reaction chamber, the electromagnetic field causing pyrolysis of the at least one catalyzed molecule in reaction chamber, resulting in at least two cracked elements, at least one of the two cracked elements being a bespoke form of carbon; and removing the at least two cracked elements from the reaction chamber via at least one output mechanism.

The method of any preceding clause, wherein, during operation: at least one processor communicates with an oscillator to cause the inductive coil to create the electromagnetic field using an alternating current.

The method of any preceding clause, wherein, during the operation: at least one processor communicates with the at least one sensor to determine a remaining amount of the catalyst within the reaction chamber.

The method of any preceding clause, wherein the gas comprises hydrocarbons, and wherein the at least two cracked elements further comprise at least one resulting gas.

The method of any preceding clause, further comprising: forcing the gas into at least one additional reaction chamber containing additional catalyst, resulting in additional fluidized gas in the at least one additional reaction chamber; mixing the additional fluidized gas with the additional catalyst, resulting in at least one additional catalyzed molecule; cracking the at least one additional catalyzed molecule via pyrolysis in the at least one additional reaction chamber, resulting in at least two additional cracked elements; and removing the at least two additional cracked elements from the reaction chamber via at least one additional output mechanism, wherein the catalyst of the reaction chamber and the additional catalyst of the at least one additional reaction chamber are distinct such that the at least two cracked elements produced by the reaction chamber are distinct from the at least two additional cracked elements produced by the at least one additional reaction chamber.

A system compromising: a fluidized bed reactor, where cracking of an inert gas occurs within the fluidized bed reactor using a combination of an electromagnetic field and a catalyst with electro-magnetic properties, resulting in at least one of a targeted carbon black and a carbon nano-object.

The system of any preceding clause, wherein the system generates no carbon dioxide emissions.

The system of any preceding clause, further comprising: a plurality of sensors; and a controller, wherein the controller receives sensor data from the plurality of sensors within the system and modifies aspects of the system based on the sensor data.

The system of any preceding clause, wherein the controller modifies at least one of energy, heat, magnetic, oscillation timing, catalyst supply, and gas speeds within the system.

A system comprising: a reaction chamber, where cracking of an inert gas occurs within the reaction chamber using a combination of an electromagnetic field and a catalyst with electro-magnetic properties, resulting in at least one of a targeted carbon black and a carbon nano-object.

The system of any preceding clause, wherein the system fluidizes the catalyst without pressure from gases and without pressure from gravity, such that the system can be turned horizontally, vertically, or in any other direction.

The system of any preceding clause, further comprising: a plurality of sensors; a controller, wherein the controller receives sensor data from the plurality of sensors within the system and modifies aspects of the system based on the sensor data.

The system of any preceding clause, wherein the controller modifies at least one of energy, heat, magnetic, oscillation timing, catalyst supply, and gas speeds within the system.

We claim:

1. A method comprising:

receiving gas at a gas input receiver, resulting in input gas;

forcing the input gas from the gas input receiver through a fluidization plate and into a reaction chamber, the reaction chamber encircled by an inductive coil, the fluidization plate located between the gas input receiver and the reaction chamber, resulting in fluidized gas in the reaction chamber;

mixing the fluidized gas with a catalyst stored in the reaction chamber, resulting in at least one catalyzed molecule;

generating, via the inductive coil, an electromagnetic field within the reaction chamber, the electromagnetic field causing pyrolysis of the at least one catalyzed molecule in reaction chamber, resulting in at least two cracked elements, at least one of the two cracked elements being a bespoke form of carbon;

removing the at least two cracked elements from the reaction chamber via at least one output mechanism;

forcing the gas into at least one additional reaction chamber containing additional catalyst, resulting in additional fluidized gas in the at least one additional reaction chamber;

mixing the additional fluidized gas with the additional catalyst, resulting in at least one additional catalyzed molecule;

cracking the at least one additional catalyzed molecule via pyrolysis in the at least one additional reaction chamber, resulting in at least two additional cracked elements; and removing the at least two additional cracked elements from the reaction chamber via at least one additional output mechanism, wherein the catalyst of the reaction chamber and the additional catalyst of the at least one additional reaction chamber are distinct such that the at least two cracked elements produced by the reaction chamber are distinct from the at least two additional cracked elements produced by the at least one additional reaction chamber.

2. The method of claim 1 wherein, during operation:

at least one processor communicates with an oscillator to cause the inductive coil to create the electromagnetic field using an alternating current.

3. The method of claim 2, wherein the electromagnetic field causes pyrolysis, thereby creating a fluidizing affect without the use of gases.

4. The method of claim 1, wherein while generating the electromagnetic field:

at least one processor communicates with at least one sensor to determine a remaining amount of the catalyst within the reaction chamber.

5. The method of claim 4, wherein the at least one sensor communicates with a processor to determine a rate of generating the at least two cracked elements.

6. The method of claim 1, wherein the gas comprises hydrocarbons, and wherein the at least two cracked elements further comprise at least one resulting gas.

* * * * *